— US005475396A

United States Patent [19]
Kitajima et al.

[11] Patent Number: 5,475,396
[45] Date of Patent: Dec. 12, 1995

[54] DISPLAY SYSTEM

[75] Inventors: Masaaki Kitajima, Hitachioota; Takashi Suzuki, Mobara, both of Japan

[73] Assignee: Hitachi, Ltd., Tokyo, Japan

[21] Appl. No.: 183,908

[22] Filed: Jan. 21, 1994

Related U.S. Application Data

[63] Continuation of Ser. No. 560,786, Jul. 31, 1990, abandoned.

[30] Foreign Application Priority Data

Aug. 4, 1989 [JP] Japan ................................. 1-201180

[51] Int. Cl.⁶ ............................................... G09G 3/36
[52] U.S. Cl. .............................. 345/92; 345/94; 345/208
[58] Field of Search .............................. 345/90, 92, 93, 345/94, 95, 96, 101, 208; 359/53, 54, 55, 57, 59

[56] References Cited

U.S. PATENT DOCUMENTS

| | | | |
|---|---|---|---|
| 4,710,768 | 12/1987 | Takeda et al. | 340/784 |
| 4,775,861 | 10/1988 | Suito | 340/784 |
| 4,782,337 | 11/1988 | Clerc et al. | 340/752 |
| 4,818,981 | 4/1989 | Oki et al. | 340/784 |
| 4,820,222 | 4/1989 | Holmberg et al. | 340/784 |
| 4,846,557 | 7/1989 | Leroux et al. | 359/55 |
| 4,851,827 | 7/1989 | Nicholas | 340/784 |
| 4,922,240 | 5/1990 | Duwaer | 340/719 |
| 4,930,874 | 6/1990 | Mitsumune et al. | 350/333 |
| 4,945,352 | 7/1990 | Ejiri | 340/805 |

*Primary Examiner*—Richard H. Hjerpe
*Assistant Examiner*—Steve J. Saras
*Attorney, Agent, or Firm*—Antonelli, Terry, Stout & Kraus

[57] ABSTRACT

A display system has signal lines and scanning lines arranged in a matrix with the signal lines extending generally perpendicular to the scanning lines. At each intersection of the signal and scanning lines is a display unit, each such unit having a display element such as a liquid crystal display element, a switching means between the display element and the signal line, and a current limiting means between the switching element and the scanning line. By applying suitable signals to the signal and scanning lines, from suitable signal and scanning controllers, each display unit may be addressed. In order to prevent defects due to a short circuit across the switching element between the current limiting means and the signal line, signals are applied to the signal lines at times other than when signals are applied to the scanning lines. Therefore, a suitable voltage can be applied to any defective display unit so as to cause the display element to be controlled so that it is in the desired state. Thus, if the display elements are liquid crystals, they may be controlled so as to be dark if they are faulty.

33 Claims, 24 Drawing Sheets

DISPLAY SYSTEM

This application is a continuation of application Ser. No. 07/560,786 filed on Jul. 31, 1990 now abandoned.

BACKGROUND OF THE INVENTION

The present invention relates to a display system, and in particular, to a method of operating such a display system.

It is known to provide a display system having a plurality of scanning lines and a plurality of signal lines arranged so as to form a matrix. The scanning lines extend generally perpendicularly to the signal lines in the array, and at each intersection of a signal line and a scanning line, there is a display unit. Each display unit is connected to the immediately adjacent scanning and signal line, and may be addressed by applying suitable signals to those scanning and signal lines. It can thus be seen that by sequentially applying such signals to the signal lines, and then, while each signal is applied to a signal line, sequentially applying signals to the scanning lines, each display element can be uniquely and sequentially addressed.

For a display system, each display unit may comprise a display element such as e.g. a liquid crystal display element, with the display element being connected via a switching element to the immediately adjacent switching line. The switching element may, for example, be a thin film transistor (referred to hereinafter as a "TFT"), and the gate electrode of that TFT is connected to the adjacent scanning line. Thus, when signals are applied to the scanning and signal lines connected to a display unit, the TFT is made conductive so that the display element may be actuated.

One problem with such a system is that if there is a short across the switching element, then there is a direct connection between the corresponding signal and scanning lines, which could cause malfunction of the device. To prevent this, it has been proposed in JP-A- 61-250969 (1986) to provide a current limiting means in the form of a resistive element, between the source electrode of the TFT (i.e. the drive electrode which is not connected to the display element), and the adjacent signal line. The current limiting means prevents interference between the scanning voltage and the signal voltage, but the provision of such a current limiting means presents further problems.

Firstly, the resistance of the current limiting means has the effect of lengthening the time needed for writing a signal applied to the signal line to the display element. When the display element is a liquid crystal, and that liquid crystal is made large in area, the capacitants of the liquid crystal layer increases, thereby reducing the effective scanning time. When this is combined with the lengthening in the time for writing from the signal line to the display unit, the voltage written to the liquid crystal display element is insufficient, so that the contrast of the liquid crystal display element of the display unit is not sufficiently high. Furthermore, any variation in the resistance of the current limiting means will cause a variation in this effect, so that the brightness of the display unit may vary across the matrix of the display system.

Therefore, it has also been proposed, in JP-A-60- 097384 (1985), to provide a current limiting means between the control electrode (gate) of the TFT and the scanning line.

SUMMARY OF THE INVENTION

The inventors of the present application have investigated a display system in which the current limiting means is between the scanning line and the control electrode of the switching element, and have found that there is a problem. To understand this problem, it is first necessary to appreciate that there are two different types of liquid crystal display. Firstly, there is a type known as the "normally white" type, in which each display element is normally bright, in the absence of a signal to its corresponding scanning and control lines. The second type, known as the "normally black" type, operates in the opposite way with each display unit being dark in the absence of the appropriate signals. It should be noted that the classification of a device as "normally white" or "normally black" is not dependent on intrinsic properties of the display element itself, but on properties of the polarisers which are used in conjunction with liquid crystal components. In such an arrangement, light passes through a first polariser, through the liquid crystal which changes the polarisation of the light in dependence on the state of the crystal, and to a second polariser. If, in the absence of appropriate signals to the liquid crystal display element, the light which has passed through it reaches the second polariser with a polarisation crossed with the polarisation of the polariser, then the display system operates in the normally black mode. If, on the other hand, such light reaches the second polariser with its direction of polarisation the same as the direction of polarisation of the polariser, then the system operates in the normally white mode. Of course, when appropriate signals are applied to the liquid crystal display elements, then the brightness of the element depends on those signals.

If there is a short across the switching element, as described above, then no signal can be applied to the display element, and the brightness of that element then depends on whether the system is of the normally white or normally black type. If the system is of the normally white type, a defective display unit, i.e. a display unit in which there is a short as described above, shows as a point of brightness in the display, which is readily visible to the observer. Therefore, measures need to be taken to resolve this.

The inventors of the present invention have found that it is then necessary to apply a suitable voltage across the display element, from the signal line, to control the state of the display element so that, irrespective of whether the system is of the normally white or normally black type, the display element of the faulty display unit is dark.

Of course, any signal applied to the signal line is also applied to the drive electrodes of the switching elements of any other display unit which is connected to that signal line, and this could cause a faulty display if, while that signal was applied, a signal was also applied to the corresponding scanning line. Therefore, the present invention proposes that the signal is applied to the signal line at a time other than the application of scanning voltages to the scanning lines.

It should be noted that, although the present invention has been described in terms of a defect in a normally white type of display system, the classification of a system as normally white or normally black does not depend on the electrical components of the display system, and therefore the present invention is considered to have general application. Furthermore, although the present invention has been described above in connection with a liquid crystal display element, it may be applied to other types of display elements which are affected by shorts in the switching element to which they are connected.

Consideration must also be given to the magnitude of the voltage to be applied to the signal line to put a faulty display unit into the correct state. For a faulty liquid crystal, the brightness thereof depends on the voltage applied thereto, not only for the voltage applied according to the present invention, but also on the other voltages which are applied to the corresponding signal line during the operation of the display system. Normally, the brightness of a liquid crystal display element depends on the root mean square value of the voltages applied to the signal line, and therefore the magnitude of the voltage applied according to the present invention is selected to maintain that root mean square value constant. In this way, the brightness of the display element of a faulty display unit may be maintained substantially constant. It is desirable, at least in theory, for the voltage to be chosen so that that brightness state is substantially zero, but in practice a brightness level between zero percent and ten percent of the maximum possible brightness of the display element is sufficient.

Normally, the current limiting means of each display unit will be a resistance, preferably with a resistance between $1M\Omega$ and $10M\Omega$. The resistance may be formed by a doped semiconductor layer or a polysilicon layer.

A second aspect of the present invention is concerned with the case where the current limiting means is resistive. In that case, the performance of the display system may depend on the relationship between that resistance and the connection resistances of the signal and scanning lines to the control circuits, and to the internal resistances of those control circuits themselves. Since these latter factors are not fixed, this further aspect of the present invention proposes that the resistance of the current limiting means be adjusted in dependence on the resistances of the control circuits. Preferably, this is achieved by adjusting the lengths of the resistances.

A third aspect of the present invention is concerned with the signal and scanning lines themselves. From the above description, it is clearly important that signals can be applied to the display units, but it is also clear that any break in a scanning or signal line will prevent at least some of the display units being addressed. Therefore, in order to overcome this problem, it is proposed that the scanning and signal lines each comprise over at least part of their length, a pair of conductors, with the display unit being connected to both those conductors, for the connection of the display unit to the signal line and for the connection of the display unit to the scanning line. Then, if there is a break in one conductor of the pair, for either the scanning or switching line, a signal can still be applied to the display unit. It is possible for the scanning and signal lines to be in the form of a pair of conductors over their entire lengths. However, this means that at the intersection of each scanning and signal line, there are four conductor intersection points, thus increasing the risk of a short between the scanning and signal lines at those intersection points. Therefore, it is preferred that, at those intersection points, the scanning and signal lines are in the form of a signal conductor, which is then branched into a pair of conductors between the intersection points.

BRIEF DESCRIPTION OF THE DRAWINGS

Embodiments of the present invention will now be described in detail, by way of example, with reference to the accompanying drawings, in which:

FIGS. 30(a)–39(l) shows steps in the process of manufacture of a display unit which may be used in the present invention;

FIG. 32 shows a practical method for varying the resistance of the current limiting element used in the present invention;

FIG. 33 is an equivalent circuit of the arrangement shown in FIG. 3; and

FIGS. 34 to 41 illustrate further display unit arrangements which may be used in the present invention, including arrangements which incorporate the third aspect of the present invention.

DETAILED DESCRIPTION

Before discussing detailed embodiments of the present invention, the principles underlying the present invention will first be discussed, referring to FIGS. 1 to 8.

Figure 1A:
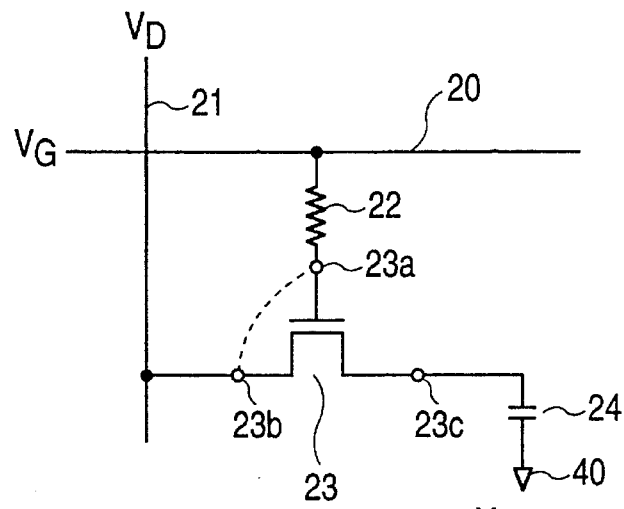
FIGS. 1(a)–1(c) is a diagram showing a display unit with a fault, and is useful in understanding the present invention.
Figure 1B:
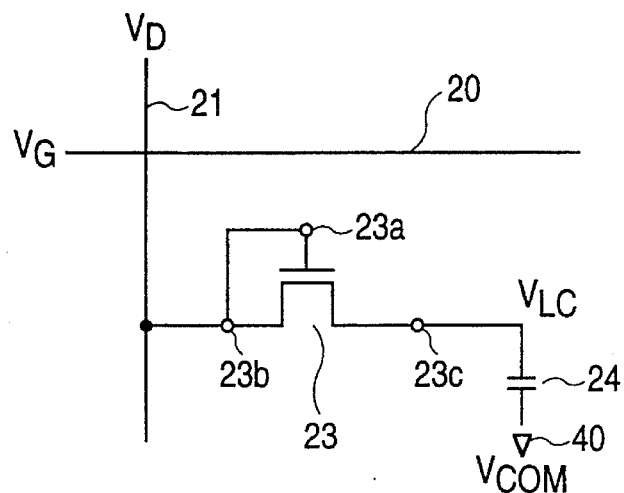

FIG. 1(a) shows part of a display system which may be used in the present invention. A scanning line 20 and a signal line 21 extend generally perpendicular to each other, and a current limiting means in the form of a resistance 22 is connected to the gate electrode 23a of a switching element in the form of a TFT 23. One drive electrode 23b of the TFT 23 is connected to the signal line 21, and the other drive electrode 23c is connected to a display element 24, such as a liquid crystal display element. That liquid crystal display element 24 is connected to a common voltage $V_{COM(40)}$ and gate voltage $V_G$ and drive voltage $V_D$ are applied to the scanning line 20 and the signal line 21 respectively.

Suppose now that there is a short circuit across the switching element 23, as shown by the dotted line in FIG. 1(a). In this case, the equivalent circuit is that shown in FIG. 1(b) with the gate electrode 23a and the drive electrode 23b of the switching element 23 being connected together. As a result, no scanning voltage can be applied from the scanning line 20, and the liquid crystal display element 24 cannot be addressed. It can further be appreciated that, in this stage, the signal voltage $V_D$ is reduced by the threshold voltage $V_{TH}$ of the TFT switching element 23, and thus appears as a voltage $V_{LC}$ across the liquid crystal display element 24. For a TFT switching element 23 made of amorphous silicon (a-Si), $V_{TH}$ is 1 to 2V, so that the liquid crystal display element 23 can be activated if the signal voltage $V_D$ is about 5 to 6V. Thus, the liquid crystal display element 24 can be set into one status.

As will now be described, it is possible to apply a suitable signal to a display unit in which there is a short, as described above, to control the liquid crystal display element 24 so that the liquid crystal display element 24 appears dark, when viewed as part of the display system, irrespective of whether the system is of the normally white or normally dark type.

Figure 2:
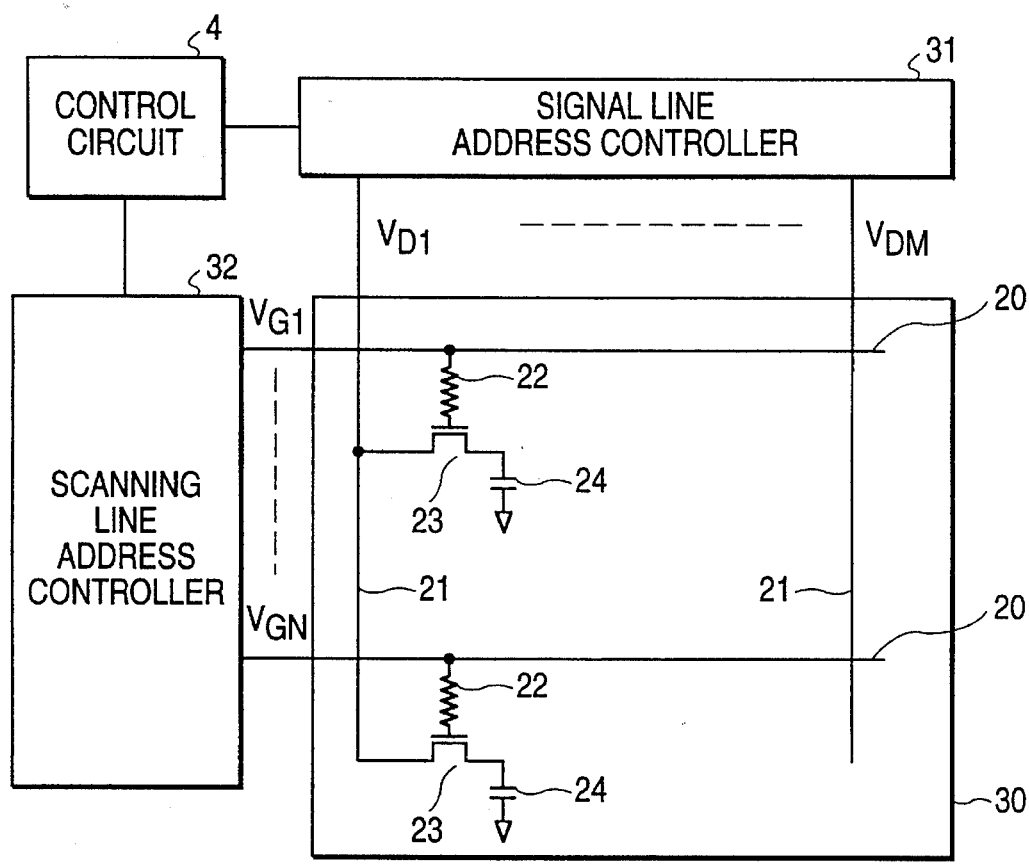
FIG. 2 shows a display system according to the present invention, in which the problems of the fault discussed with reference to FIG. 1 are illustrated.

Consider now the display system shown in FIG. 2, which illustrates a plurality of signal lines 21 and a plurality of scanning lines 20 in a matrix 30. The signal lines 21 are connected to a signal line address controller 31, and the scanning lines 20 are connected to a scanning line address controller 32, with both controllers 31 and 32 being connected to suitable control circuit 4. At the intersection of the scanning and control lines 20 and 21 are display units, each comprising a display element 24, a switching means 23, and a current limiting element in the form of a resistor 22 connecting the gate electrode of the switching element 23 to the signal line. For the sake of convenience, only two such display units are shown. However, in general, the number of display units is M×N for N scanning lines and M signal lines and the switching element 23 is driven by scanning voltages $V_{G1}$ to $V_{GN}$ and signal voltages $V_{D1}$ to $V_{DM}$ to control the brightness of the display elements 24.

Figure 3:
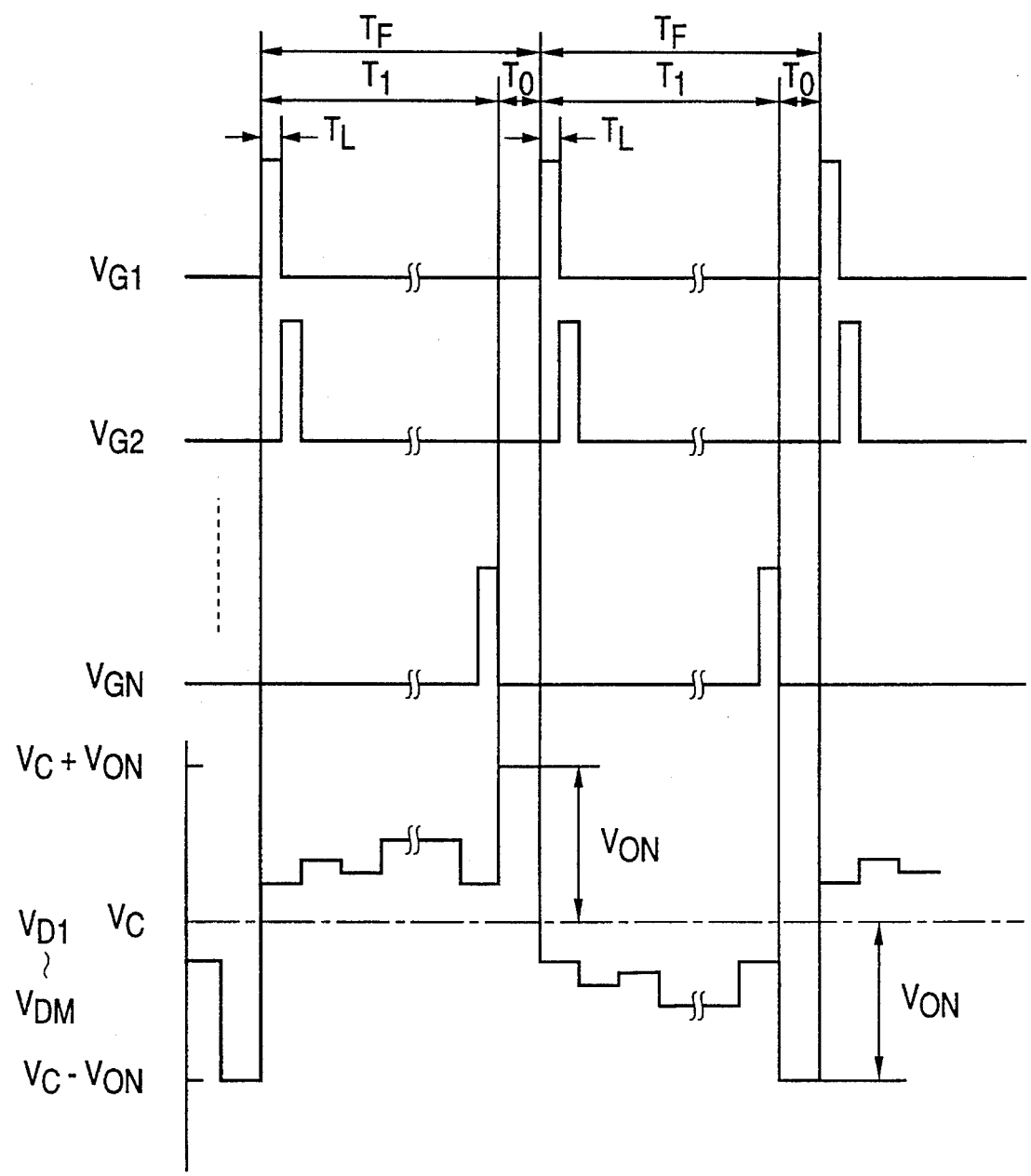
FIG. 3 illustrates waveforms of voltages applied to the arrangement of FIG. 2.

FIG. 3 shows the timing waveforms of the scanning and signal voltages. The application of the scanning and signal voltages is divided into a plurality of consecutive frames, with each frame having a duration $T_F$. That period $T_F$ of one frame comprises a scanning time $T_1$ for writing voltages to the liquid crystal display elements 24, and a non-scanning time (flyback time) $T_0$, Then, the scanning time $T_L$ for one line is:

$$T_L = (T_F - T_0)/N.$$

It can thus be seen that scanning the pulses are sequentially applied to signal lines during each frame as voltage pulses $V_{G1}$ to $V_{GN}$.

During the time $T_0$, no scanning pulses are applied to the scanning lines, and therefore the present invention proposes that this time is used to apply a constant signal $V_{ON}$ to the display elements 24 to put them in the desired state. Since the purpose of the voltage $V_{ON}$ is to put into an inconspicuous state display units connected to those switching elements in which there is a short, it need not always be applied to all the signal lines (although this might be the easiest approach), but does need to be applied to those signal lines which are connected to a display unit in which there is a short.

It can be seen from FIG. 3 that the voltages applied to the signal lines have opposite magnitudes for successive frames. Then, the brightness of each display element 24 is determined by the root mean square of the voltage applied.

It is found that the root mean square voltage $V_{RMS}$ is given by the equation:

$$V_{RMS} = \sqrt{\frac{1}{T_F} \cdot (V_{ON}^2 T_0)} = V_{ON}\sqrt{\frac{T_0}{T_F}}$$

Thus, the value of $V_{RMS}$ can be adjusted by adjusting either the magnitude of the signal $V_{ON}$ or by varying the relative length of $T_0$ and $T_F$. Although it is possible to vary this latter ratio, some display arrangements, such as in a television set, require a fixed time $T_0$, so that it is more practical to vary the signal $V_{ON}$.

Figure 4:
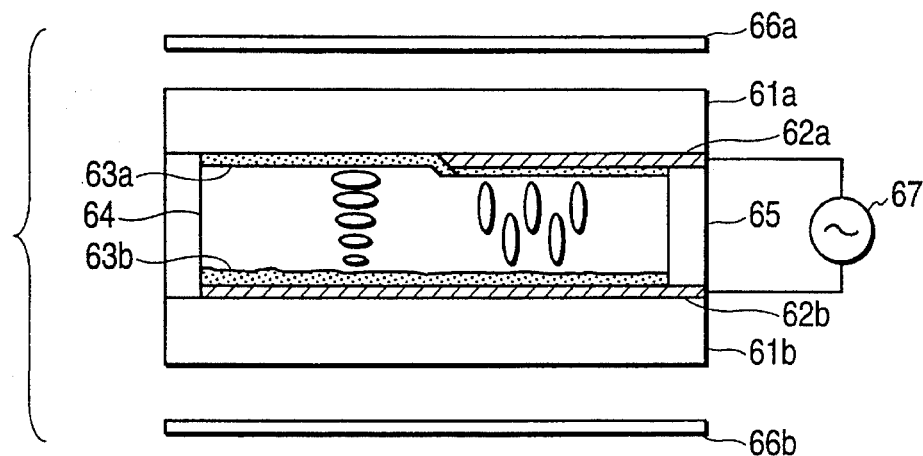
FIG. 4 shows the optical structure of a liquid crystal display component which may be used in the present invention.

Before discussing the signal $V_{ON}$ in more detail, the general structure of a display system incorporating a liquid crystal display element needs to be considered. FIG. 4 illustrates in schematic sectional view of a twisted nematic liquid crystal display component of a field effect type. This component includes a pair of transparent substrates 61a and 61b sealed together in spaced relation to each other by means of a sealing material 65, which also serves as a spacer, a pair of transparent electrodes 62a and 62b, a pair of liquid crystal molecule orientation layers 63a and 63b, a layer of twisted nematic liquid crystal 64, and a pair of polarising filters 66a and 66b. The transparent electrodes 62a and 62b are electrically connected to a drive circuit 67. Consider now a ray of light passing through the component of FIG. 4, in the downward direction in the figure. The only light that passes the first polariser 66a is that polarised in the same direction as that polariser 66a. As the then polarised light passes through the liquid crystal layer 64, its direction of polarisation is rotated, and the subsequent path of that light depends on the orientation of its polarisation relative to the direction of polarisation of the second polariser 66b. If the polarisation direction of the light is the same as that of the polariser 66b, the light will pass through and therefore the component will, when viewed from below, appear bright. If the direction of polarisation of the light is not the same as that of the polarisation of the polariser 66b, the component will appear dark. Of course, the effect that the liquid crystal layer 64 has in rotating the polarisation of the light is varied by the drive circuit 67, but the component can be set up so that, in the absence of any signal from the drive circuit 67, either the liquid crystal layer 64 rotates the polarisation of the light so that it coincides with the direction of polarisation of the polariser 66b, or that it does not. These two types, as discussed above, are known as the normally white and normally black types of liquid crystal display system. It can be seen from FIG. 4 that this classification depends only on the orientation of the polarisers 66a and 66b.

Figure 5:
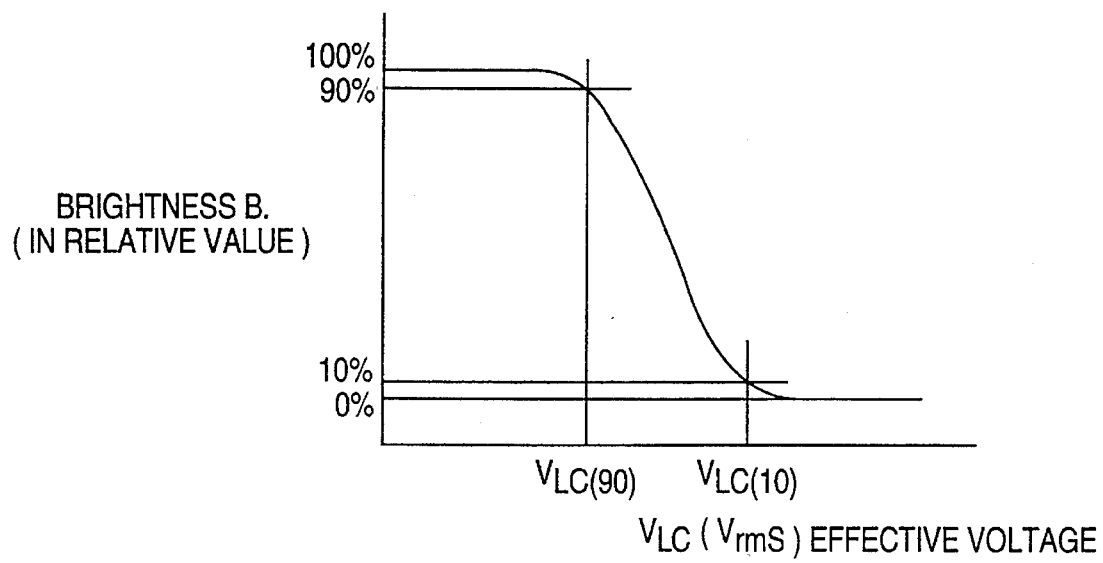
FIG. 5 shows the variation of brightness of a liquid crystal component with effective voltage applied thereto.

FIG. 5 shows the relationship between the effective level $V_{LC}$ of the voltage applied to the liquid crystal display element 24 and the (relative) brightness of the display element 24 for a device operating in the normally white mode. In general, when viewed by the eye, a display element appears dark if its relative brightness is 10% or less of the maximum brightness, and thus if $V_{LC}$ is equal to or greater than the value necessary to achieve a brightness of 10%, the display element will appear dark. This value of $V_{LC}$ is known as $V_{LC(10)}$. Of course, it is possible to make use of higher voltages, but $V_{LC(10)}$ is sufficient for practical purposes.

Figure 6:
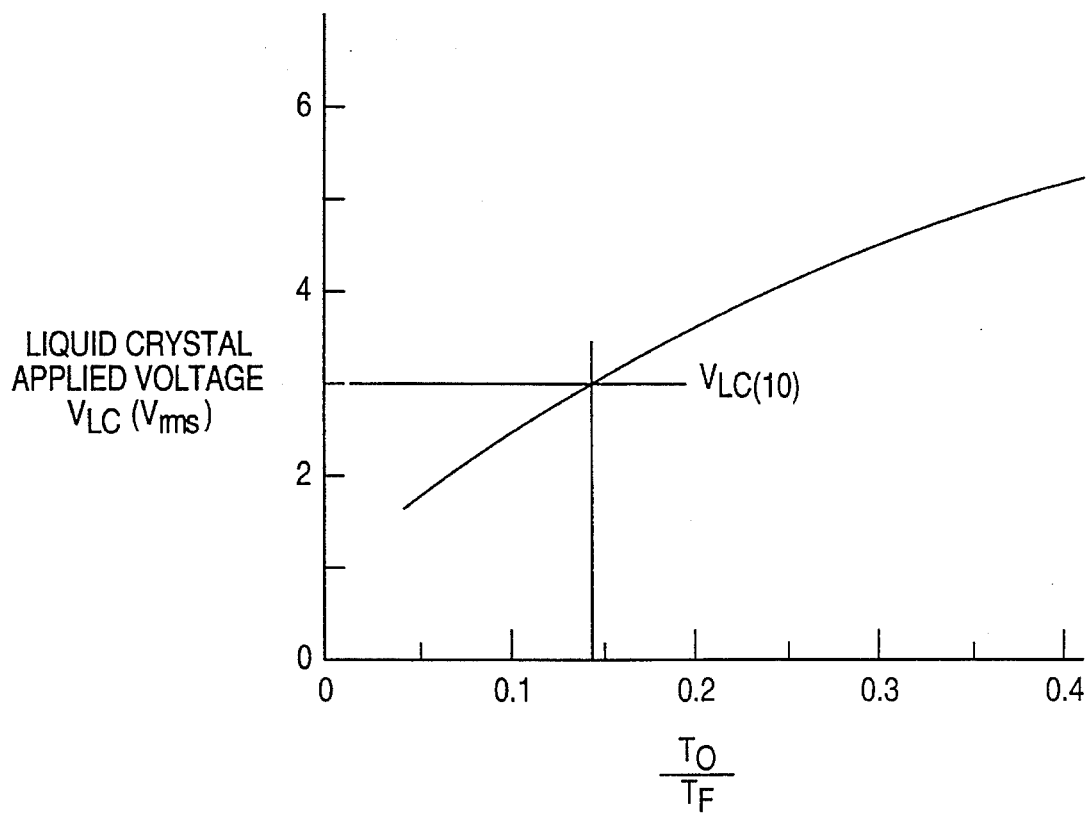
FIG. 6 shows the variation in the voltage applied to a liquid crystal, in dependence on relationships within the timing of the waveforms illustrated in FIG. 3.

FIG. 6 shows the variation in the level of the voltage $V_{LC}$ applied to the display element 24 with the ratio of the total time length of a scanning frame $T_F$ to the non-scanning time $T_0$, in FIG. 3. It is assumed in FIG. 6 that the signal $V_{ON}$ is 8V and the TFT switching element 23 has a threshold voltage $V_{TH}$ of 2V. In FIG. 6, it is assumed that the signal voltage during the scanning time $T_1$ is 0V. Thus, provided $T_0/T_F$ is greater than or equal to 0.15, $V_{LC}$ is $V_{LC(10)}$ and this can render the liquid crystal display element 24 so that it appears to be dark. Of course, the value T0/$T_F$ can be reduced by setting the amplitude $V_1$ of the signal voltage to be 8V or more. Given $T_0/T_F$=0.15, $T_0$=2.5 ms for a frame frequency of 60 Hz, and a scanning line number N=480, the scanning time $T_L$ per line is reduced from 35 μs to 30 μs by setting the $T_0$ to 2.5 ms. This reduction of 5 us will not cause any practical problems.

Figure 1C:
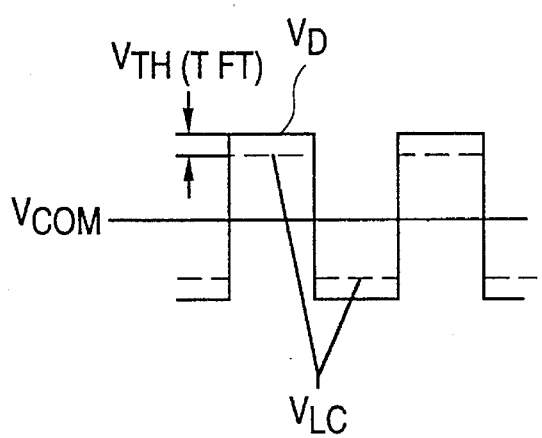

Thus, in order to achieve a dark display element, for a display system of the normally white type, when the display unit of that display element is faulty due to a short, as was discussed with reference to FIG. 1, then the root mean square voltage applied to that display element should be greater than $V_{LC(10)}$ and therefore the parameters are established for $V_{ON}$ as:

$$V_{ON}\sqrt{\frac{T_0}{T_F}} \geq V_{LC(10)}$$

Figure 7:
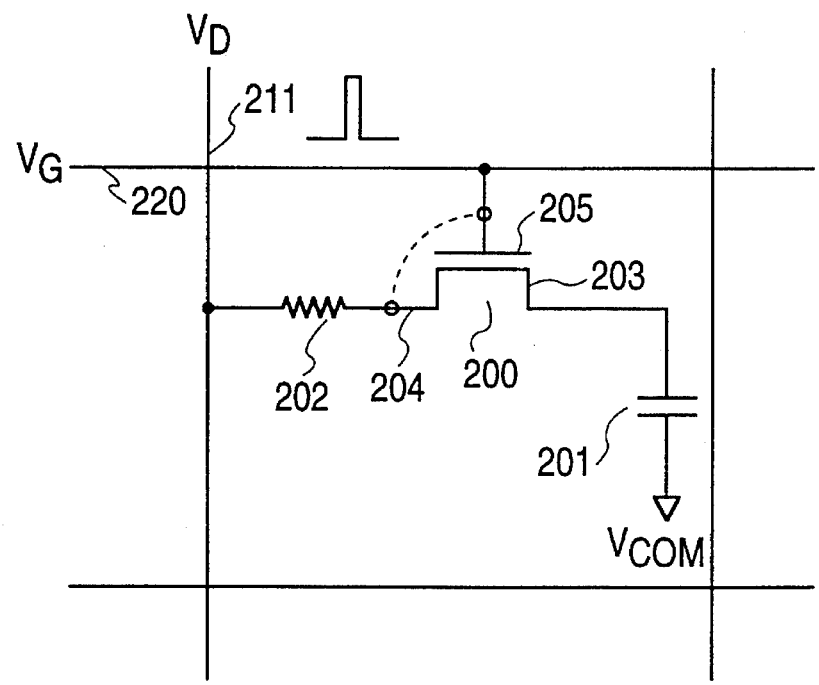
FIGS. 7 and 8 are circuit diagrams of known display units, and are useful in understanding the present invention.
Figure 8:
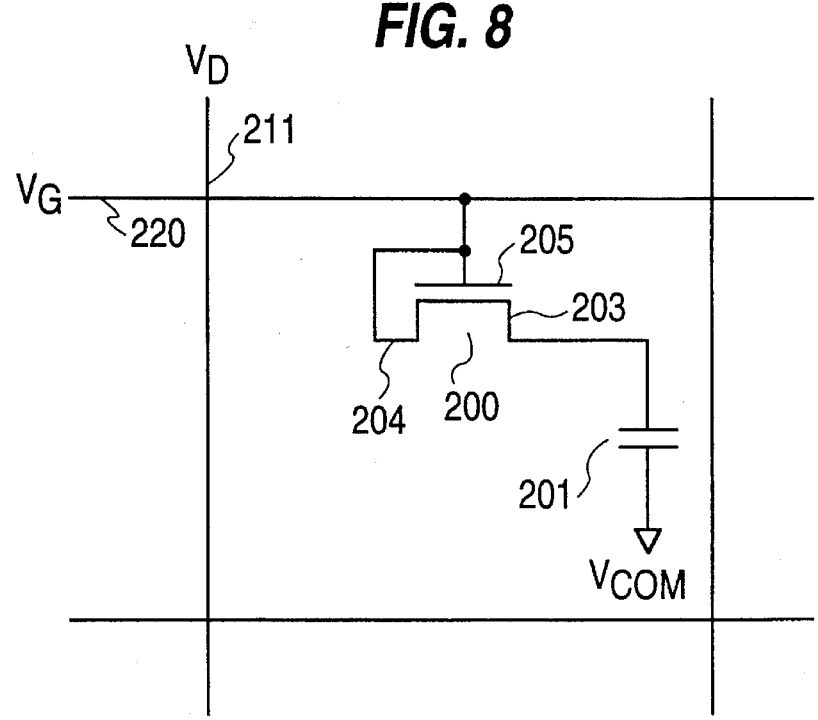

It should be appreciated that the problem sought to be solved by the present invention does not arise when the current limiting means is provided between the signal line and the drive electrode of the switching means. Referring to FIG. 7, there is shown an arrangement in which a switching element 200 is connected to a display element 201 and signal line 211 and scanning, line 220. The gate 205 of the switching element 200 is connected to the scanning line 220. The one drive electrode 203 of the switching element 200 is connected to the display element 201, and the other drive electrode 204 is connected via a current limiting means in the form of a resistance 202 to the signal line 211. If there is a short across the switching element 200, as shown by a dotted line, the resultant circuit is that shown in FIG. 8. It can then be seen that the display element 201 cannot be influenced by signals applied to the signal line 211. Instead, the scanning voltage $V_G$ is applied to the switching element 200 to the liquid crystal display element 201. As a result, the liquid crystal display element 201 has a voltage between the scanning voltage $V_G$ and a substrate potential $V_{COM}$ and the liquid crystal display element 201 will have fluctuating characteristics. There will thus be an unsatisfactory effect.

One detailed embodiment of a matrix type display system according to the present invention will now be described with reference to FIG. 9. The drive system is constructed of a drive panel matrix 30, a scanning line address controller 32 and a signal line address controller 31, a control circuit 4 and a system circuit 5.

The drive panel matrix 30 has scanning lines 20a to 20c, signal lines 21a to 21c, switching elements 8a to 8i, current limiting means 6a to 6i and display elements 7a to 7i connected to the switching elements 8a to 8i.

The switching elements 8a to 8i of the drive panel matrix 30 may be formed by transistors which are of amorphous silicon (a-Si), polycrystalline silicon (p-Si), or single-crystalline silicon.

In this embodiment, the switching elements 8a to 8i are exemplified by TFTs (i.e., the thin film transistors) having three electrodes, i.e., a gate electrode G, a drain electrode D and a source electrode S. The display elements 7a to 7i are exemplified by memory devices for storing information, devices for converting the quantity of light incident upon the drive panel matrix 30 into electric signals, light emitting devices or devices acting as optical switches, but should not be limited thereto.

This embodiment will be described by taking the liquid crystals having the functions of optical switches as an example.

Figure 9:
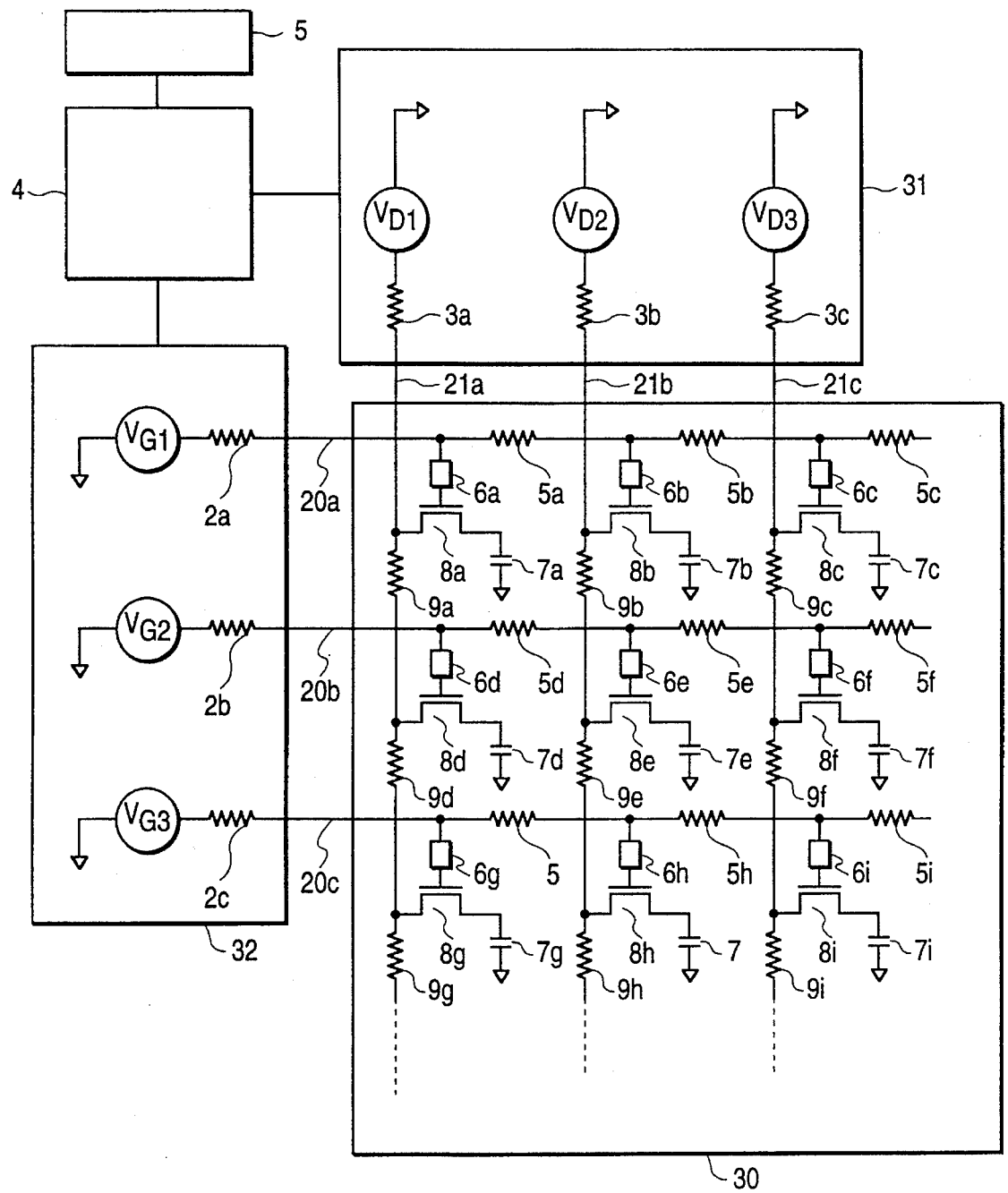
FIG. 9 shows a first practical embodiment of a display system incorporating the present invention.

In the following description, the switching elements 8a to 8i shown in FIG. 9 are exemplified by the TFTs 8a to 8i, and the display elements 7a to 7i are exemplified by liquid crystal picture elements 7a to 7i.

The TFTs 8a to 8i are turned on or off by scanning voltages $V_{G1}$ to $V_{G3}$ generated by the scanning line address controller 32. The signal line address controller 31 generates signal voltages $V_{D1}$ to $V_{D3}$ for controlling the brightnesses of the liquid crystal display elements 7a to 7i. The control circuit 4 generates signals for controlling the scanning line address controller 32 and the signal line address controller 31 from the image signal and timing signal, which are inputted from the system circuit 5.

Figure 10:
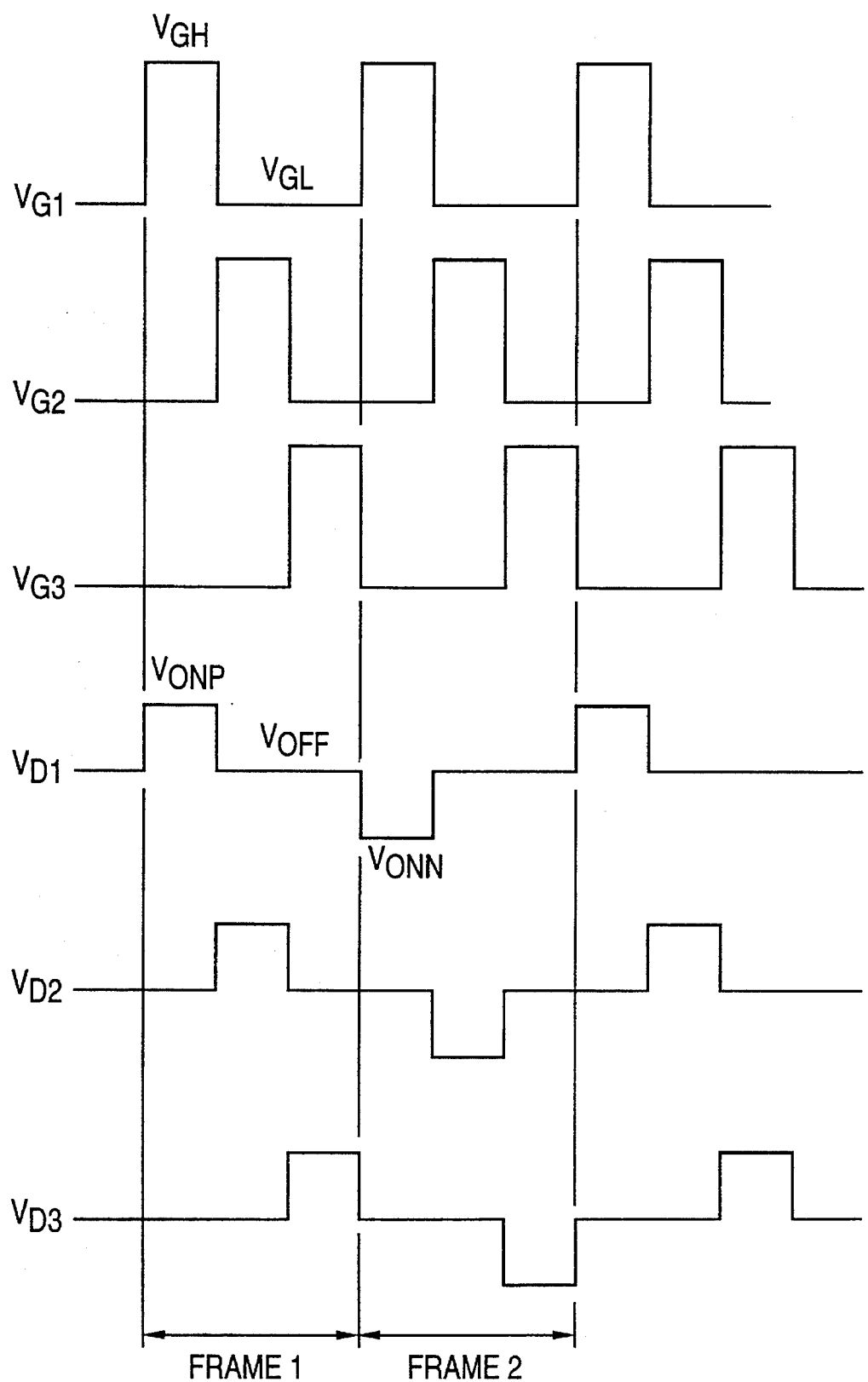
FIG. 10 shows timing waveforms for the embodiment shown in FIG. 9.

FIG. 10 shows the timing waveforms of the scanning voltages and the signal voltages when the liquid crystal display elements 7a, 7b and 7c shown in FIG. 9 are bright whereas the other liquid crystal display elements are dark.

The TFTs 8a to 8i are turned on, when the scanning voltages $V_{G1}$ to $V_{G3}$ increase to $V_{GH}$, and off when the same fall to $V_{GL}$.

On the other hand, the signal voltages $V_{D1}$ to $V_{D3}$ take a level $V_{ONP}$ (for a first frame 1) or $V_{ONN}$ (for a second frame 2) in accordance with the timings of the scanning voltages when the liquid crystal display elements are bright. When the liquid crystal display elements are dark, on the contrary, the signal voltages $V_{D1}$ to $V_{D3}$ take a level $V_{OFF}$.

By setting the scanning voltages $V_{G1}$ to $V_{G3}$ and the signal voltages $V_{D1}$ to $V_{D3}$, the liquid crystal display elements can be selectively turned bright or black so that the image can be displayed in the drive panel matrix 30.

The resistances 5a to 5i shown in FIG. 9 are provided to indicate the resistances of the scanning lines 20a to 20c, and the resistances 9a to 9i are provided to indicate the resistances of the signal lines 21a to 21c and are divided for the individual liquid crystal display elements, as shown. Those resistances should desirably have as low a level as possible, in order to reduce waveform deteriorations such as distortions of the voltage waveforms, and may have a sheet resistance e.g., 0.1 Ω/□ to 10 Ω/□.

Resistances 2a to 2c are the output (ON) resistances of the scanning line address controller 32, and resistances 3a to 3c are the output (ON) resistances of the signal line address controller 31. Again, these resistances should desirably have as low a level as possible, in order to reduce waveform distortions of the output voltages so that a satisfactory image quality can be obtained. The practical level of the resistances 2a to 2c and 3a to 3c are 0.5 KΩ to 5 KΩ. This level constitutes a major factor for the circuit structure such as the degrees of integration of the scanning and the signal line address controllers 32, 31 and for economic cost.

In the embodiment shown in FIG. 9, display defects caused by the structural defects of the TFTs 8a to 8i are prevented by two features.

Firstly, there are current limiting elements 6a to 6i, which have the effect discussed earlier, and secondly the system is operated in accordance with the present invention, under the control of the control circuit 4.

Figure 11A:
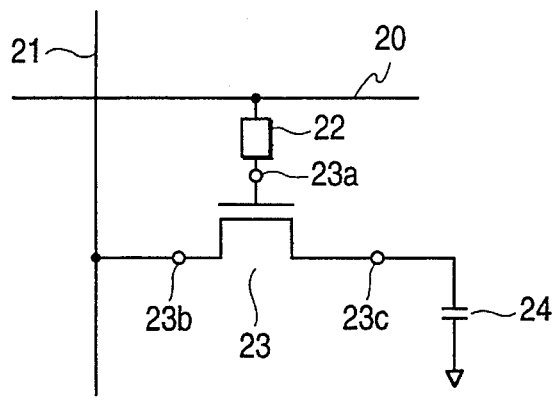
FIGS. 11(a)–11(c) shows a first practical display unit arrangement which may be used in the present invention.
Figure 11B:
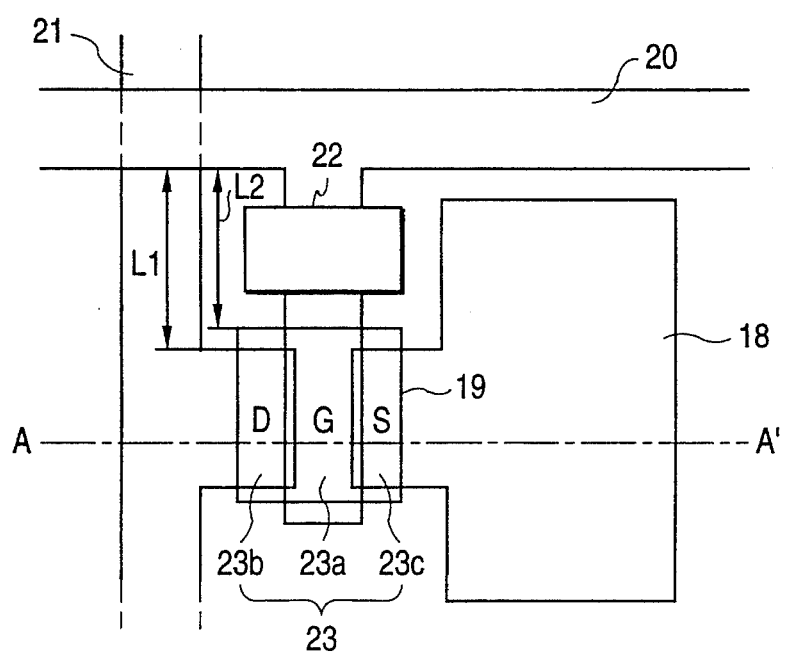
Figure 11C:
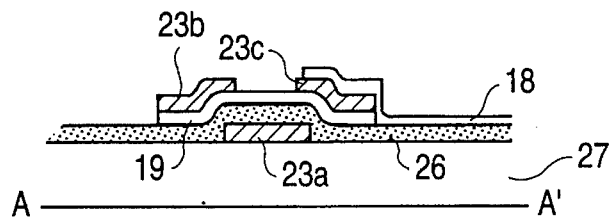

FIG. 11 shows a first practical arrangement of the TFTs.

FIG. 11(a) shows an equivalent circuit of one display unit. As in FIG. 1, this circuit has a scanning line 20, a signal line 21, a TFT 23 having a gate electrode 23a, a drain electrode 23b and a source electrode 23c, a liquid crystal display element 24, and a current limiting means 22 for limiting the current flowing between the scanning line 20 and the gate electrode 23a.

FIG. 11(b) is a top plan view showing the pattern for embodying the equivalent circuit of FIG. 11(a). In FIG.

11(*b*), a display element electrode 18 is electrically connected to a source electrode (S) 19. The display element electrode 18 forms part of the display element. The drain electrode (D) 23*b* is electrically connected to the signal line 21, and the gate electrode (G) is electrically connected through the current limiting element 22 to the scanning line 20.

The source electrode (S) 19 is formed by a semiconductor layer, the resistance of which is varied by the scanning voltage $V_G$ applied to the gate electrode 23*a*.

The semiconductor layer of the source electrode 19 may be made of a-Si or p-Si, but this choice is not significant in the present invention.

In the arrangement shown in FIG. 11, the semiconductor layer may include the impurity layer such as an n⁻ layer, which has the preferable effect of reducing the connection resistances of the source electrode (S) and the drain electrode (D) to the semiconductor layer 19.

The current limiting means 22 may limit the DC current or the AC current but its material is not significant.

Moreover, the current limiting element 22 is formed, as shown in FIG. 11(*b*), to extend in a gap L1 between at least one terminal of the drain electrode 23(*b*) and the scanning line 20. That terminal is intended to imply the side to which the scanning voltage $V_G$ is supplied. Hence, the current limiting element 22 may be formed in a gap L2 between one terminal of the semiconductor layer 19 and the scanning line 20.

A section on the line A—A' in FIG. 11(*b*) is shown in FIG. 11(*c*).

Figure 12A:
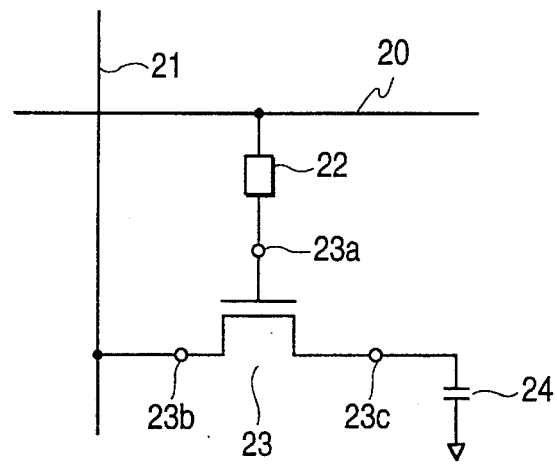
FIGS. 12(a)–12(c) shows a second practical display unit arrangement which may be used in the present invention.
Figure 12B:
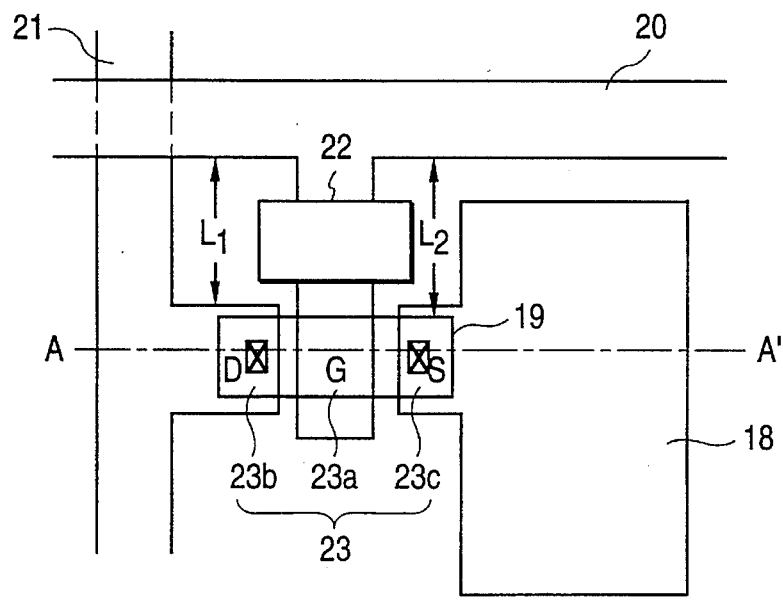
Figure 12C:
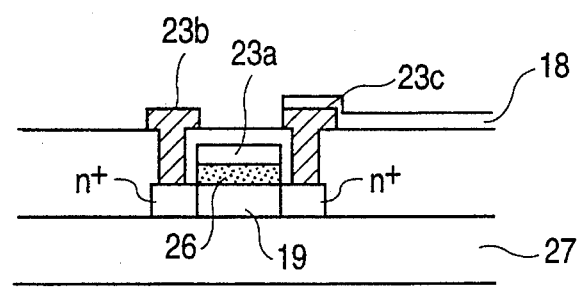

FIGS. 12(*a*) and 12(*b*) shows another TFT arrangement. The equivalent circuit including this TFT is shown in FIG. 12(*a*) and is the same as that in FIG. 12(*b*). As shown in FIG. 11(*a*), the current limiting element 22 is formed in either the gap L1 between one terminal of the drain electrode 23*b* and the scanning line or in the gap L2 between one terminal of the semiconductor layer 19 and the scanning line. Otherwise, the arrangement is the same as that of FIGS. 11(*a*) to 11(*c*).

As discussed above, the TFT 23 has current limiting means 22 connected thereto, which current limiting means has a non-superposed structure. As a result, interference between the scanning voltage and the signal voltage can be prevented even if a gate insulating film 26 and the semiconductor layer 19 are partially subjected to a dielectric breakdown, or are replaced by an obstacle of low resistance so that the gate electrode 23*a* and the drain electrode 23*b* are electrically connected by a relatively low resistance.

For practical purposes, the liquid crystal display elements are preferably dark at all non-operational times. Despite this, however, and even with the present invention, not all display element (or point) defects are not eliminated. These display element defects may be eliminated by means as shown in FIG. 13.

Figure 13:
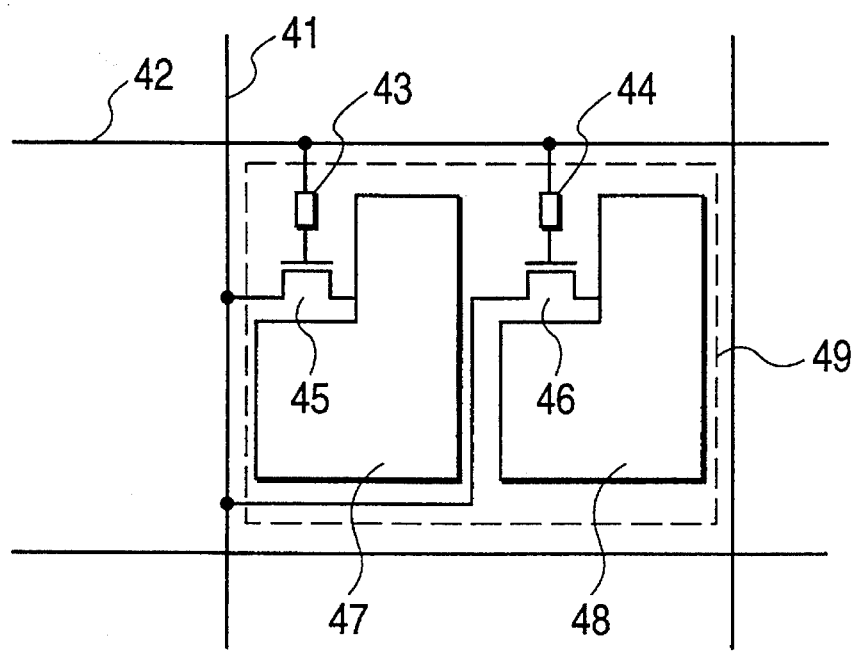
FIGS. 13 to 20 illustrate further display unit arrangements which may be used in the present invention.

FIG. 13 shows the display element structure for one display unit of a second practical embodiment of the present invention. Current limiting means 43 and 44 are connected to scanning lines 42, and the gate electrodes of TFTs 45 and 46 are connected to the current limiting means. Moreover, the individual drain electrodes of the aforementioned TFTs 45, 46 are connected to signal lines 41.

In this embodiment, if the liquid crystal display element corresponding to a display element electrode 47 is faulty, due to a short circuit such as that discussed with reference to FIG. 1, that display element may be made dark by setting the display mode of the liquid crystal in the normally white mode and by controlling the signal voltage in the status shown in FIG. 3.

However, if the liquid crystal display element corresponding to the picture display electrode 48 is not faulty, then the total effect of the combined element 49 is normal.

Here, the combined element 49 is divided into two, as shown in FIG. 13, but may be divided into three or more.

In order to match the brightness of the combined element 49 with that of standard display elements, the level of the signal voltage can be advantageously adjusted. Specifically, the amplitude of the signal voltage may be smaller than that of standard display elements.

Figure 14:
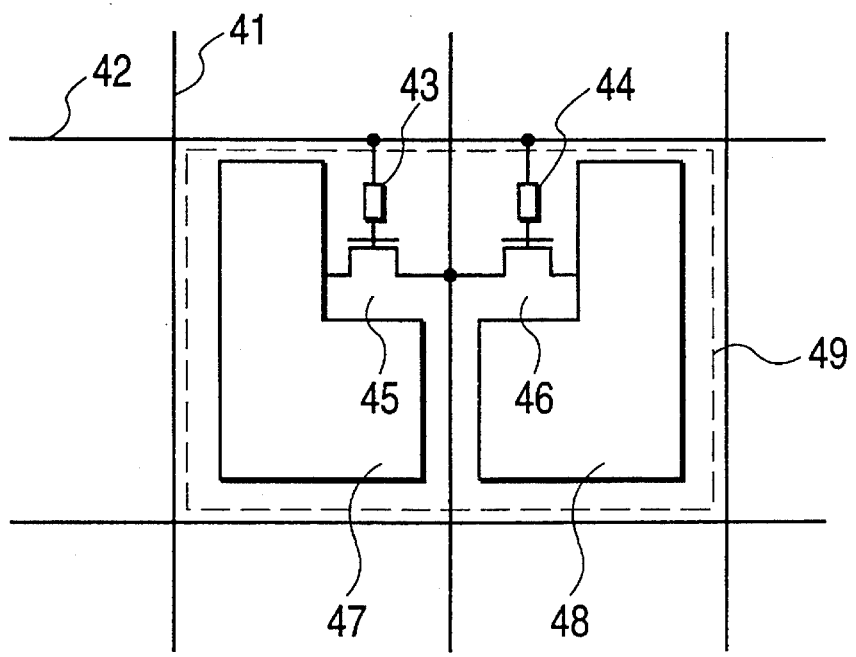
Figure 15:
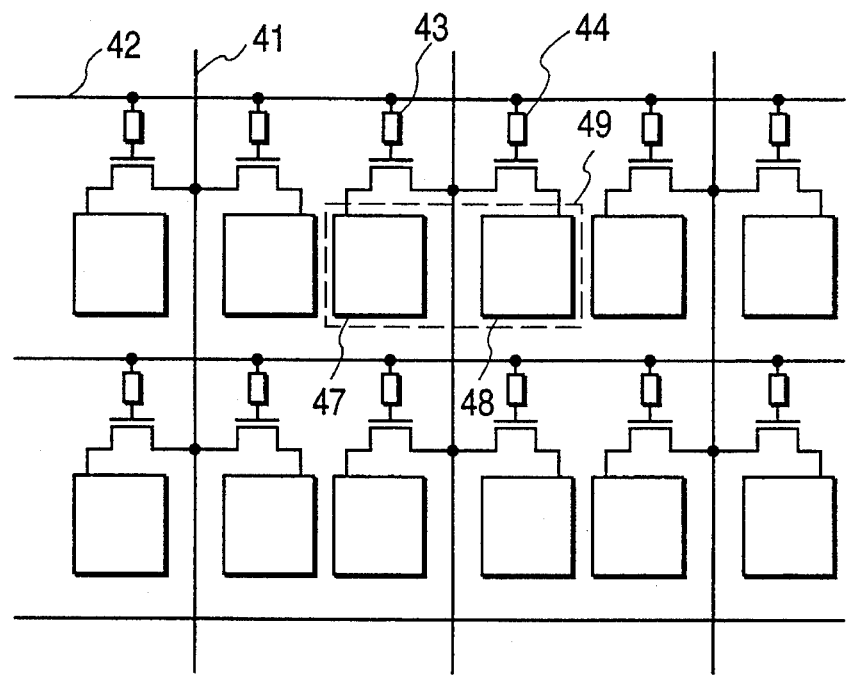
Figure 16:
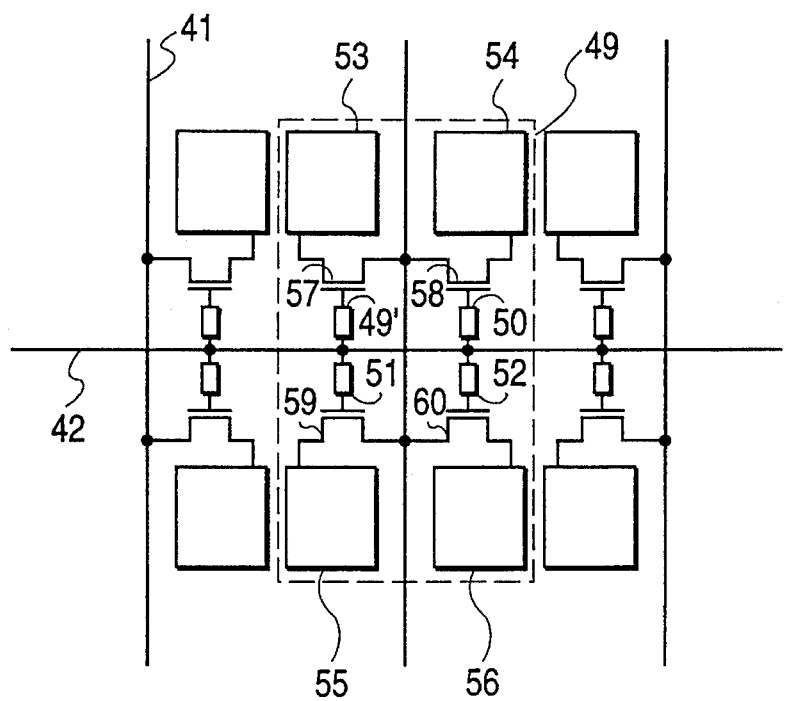

FIGS. 14 and 15 show other arrangements of the display element structures, making use of combined elements, FIGS. 13 to 15 vary only in geometry, and the same reference numerals are used to indicate corresponding parts. Since the arrangements of FIGS. 14 and 15 operate in similar ways to the arrangement of FIG. 13, further description is not necessary. FIG. 16 shows an embodiment in which the combined element is divided into four. As a result, for each display unit, the combined element has display elements 53 to 56; the TFT is divided into parts 57 to 60; and the current limiting means is divided into parts 49' to 52.

FIGS. 17 to 20 are top plan views showing parts of a display unit which may be used in the present invention. A MOS type thin film semiconductor device being a semiconductor layer 101, a drain 102, a source 103 and a gate 106. A current limiting means 104 is connected via a connection wiring line 109 between the gate 106 and a gate wiring line 110. The drain 102 is connected to a drain wiring line 108. The source 103 is connected to a display element drive electrode 111 which is made of a transparent conductive film.

Next, each structure will be described in detail with reference to the sectional views in FIGS. 21 to 30.

Figure 18:
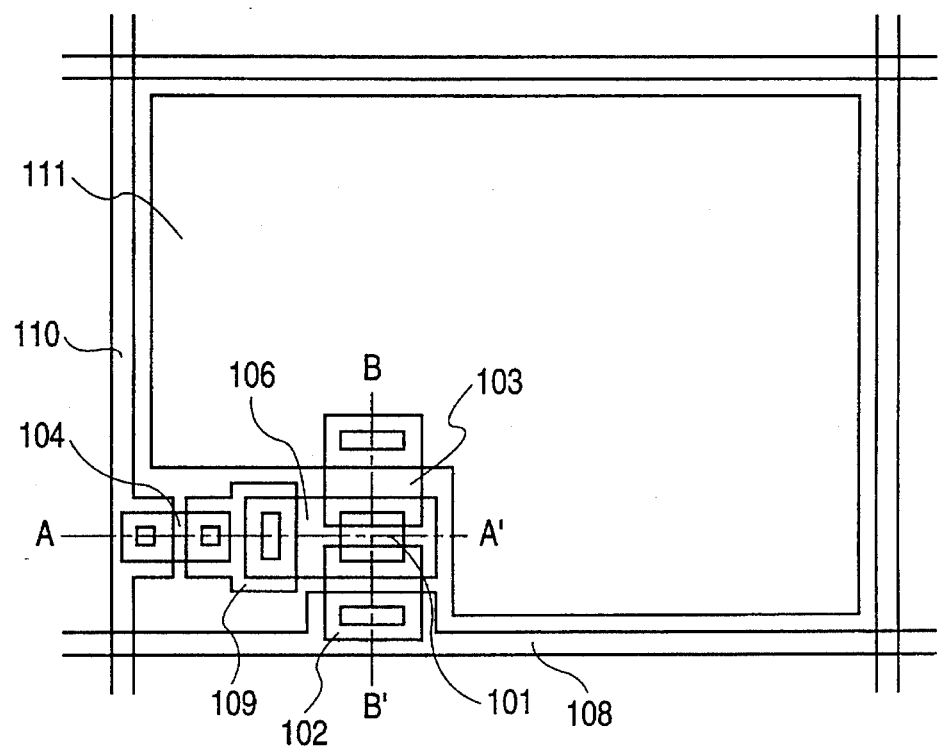
Figure 21A:
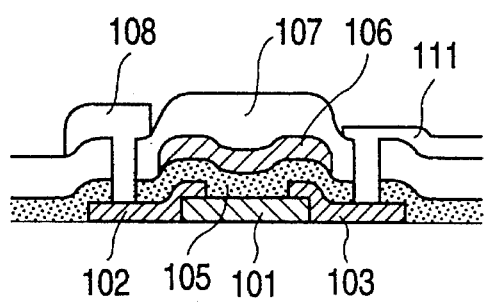
FIGS. 21(a and b) to 29(a and b) are cross-sections illustrating alternative structures of part of a display unit which may be used in the present invention.
Figure 21B:
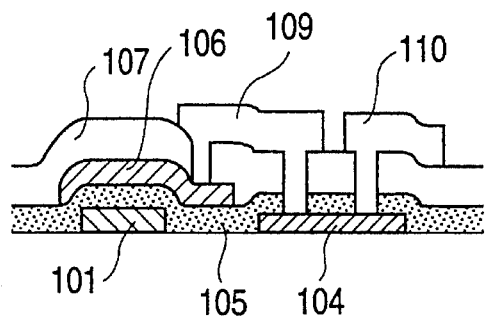
Figure 24A:
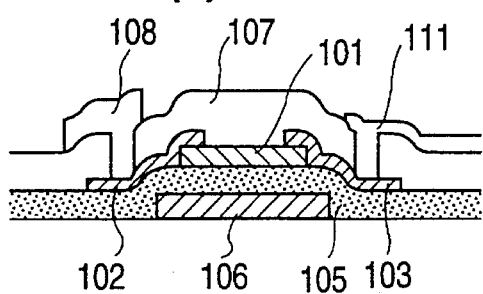
Figure 24B:
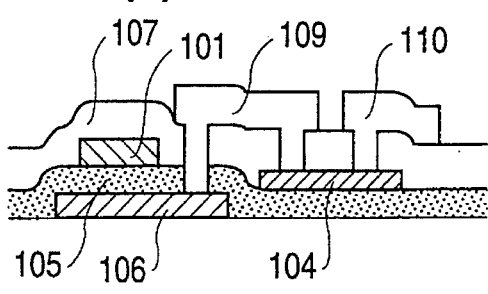

FIGS. 21(*a*) and 21(*b*) to FIGS. 24(*a*) and 24(*b*) are sectional views taken along lines B—B' and A—A' from FIGS. 18. FIG. 21 shows a coplanar structure in which the drain 102 and the source 103 are formed over the semiconductor layer 101 and, after having been coated with a gate insulating film 105, have a gate 106 formed thereto. The current limiting means 104 has a doped semiconductor as a resistance element for forming the source and drain and by forming contact holes in a passivation film 107 over the regions of the drain 102, the source 103, the gate 106 and the current limiting means 104 to form wiring connections therethrough. The current limiting means is exemplified by a resistance element made of a doped semiconductor but alternatively the current limiting means could be e.g. a load MOS equipped with a thin film semiconductor unit.

Figure 22A:
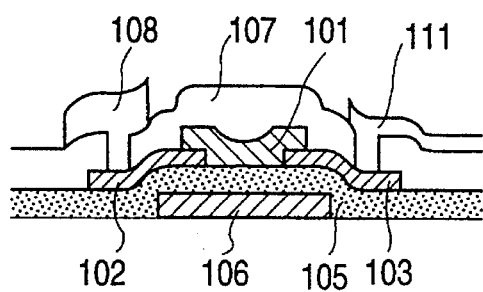
Figure 22B:
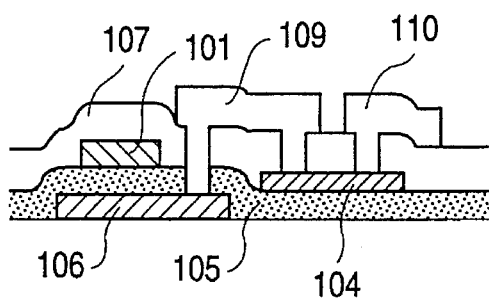

FIG. 22 is a section showing an inverted coplanar structure which has the laminations of the individual layers inverted relative to those of the coplanar structure of FIG. 21 but is otherwise the same.

Figure 23A:
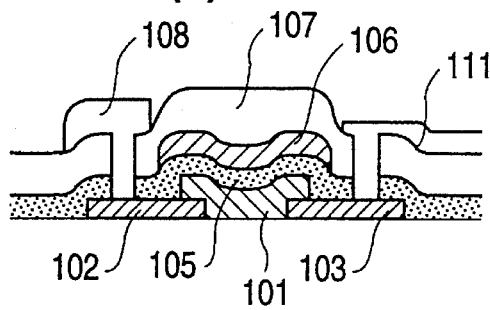
Figure 23B:
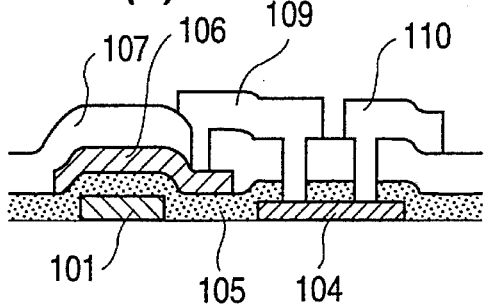

FIG. 23 is a sectional view showing a staggered structure in which the gate 106, the drain 102 and the source 103 sandwich the semiconductor layer 101 and the gate insulating film 105 and in which the semiconductor layer 101 is closer than the gate 106 to the substrate surface.

FIG. 24 is a section showing an inverted staggered structure in which order of the laminations of the individual layers of the staggered structure of FIG. 23 is inverted, but is otherwise the same as the arrangement in FIG. 23.

Figure 19:
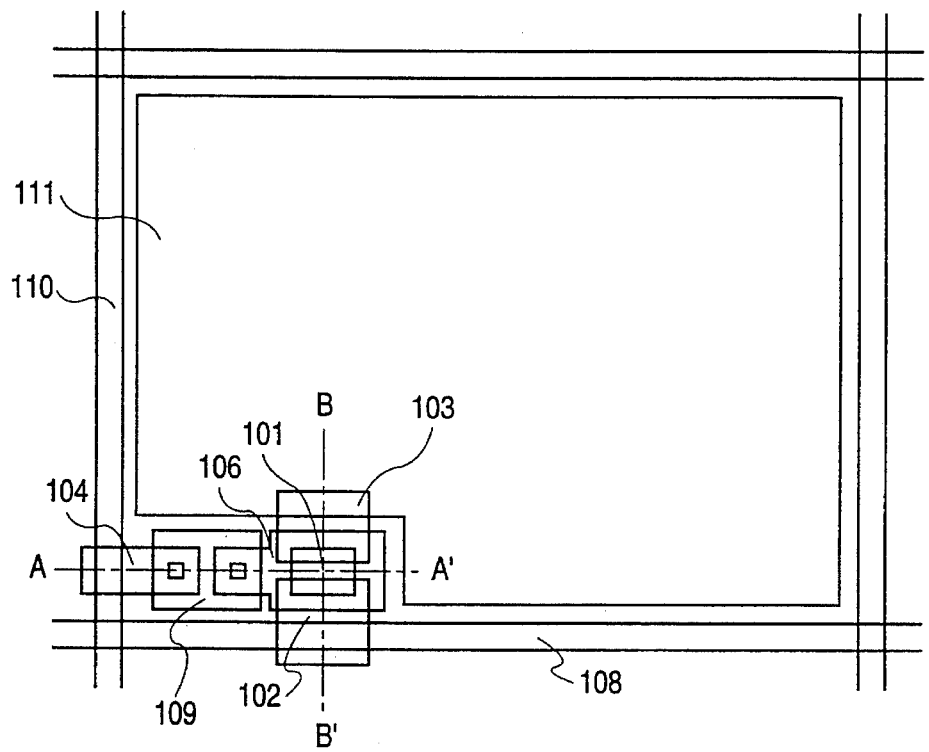
Figure 25A:
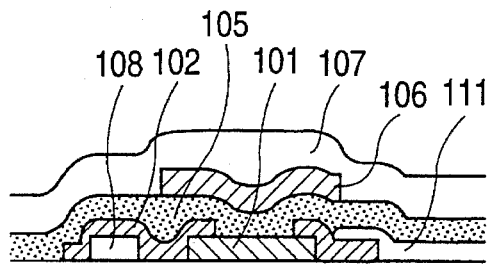
Figure 25B:
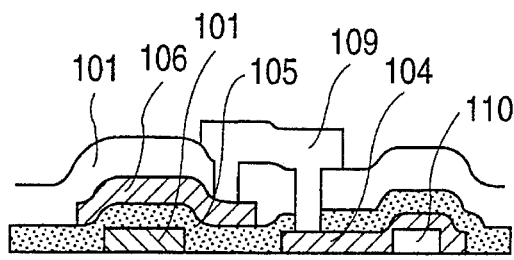
Figure 26A:
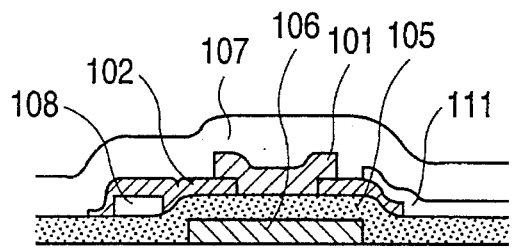
Figure 26B:
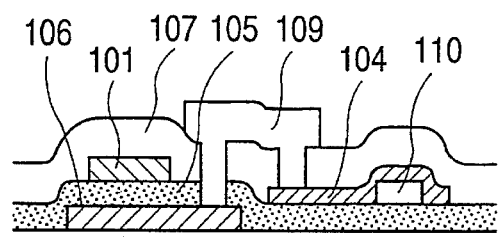
Figure 27A:
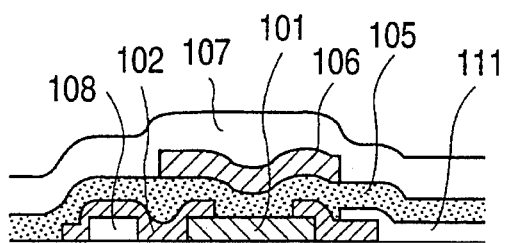
Figure 27B:
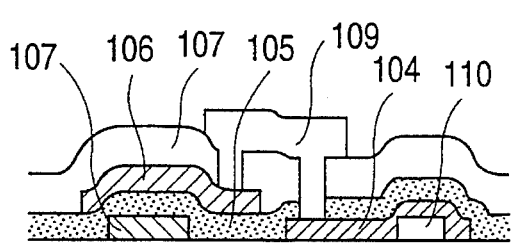
Figure 28A:
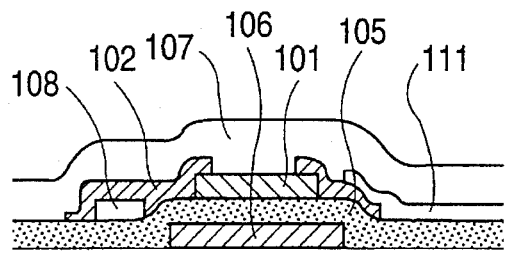
Figure 28B:
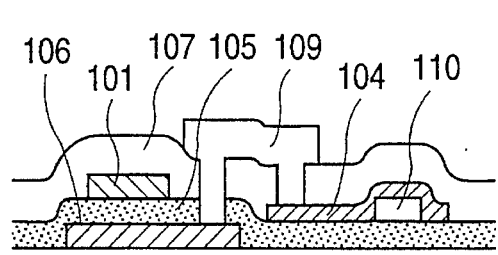

FIGS. 25(*a*) and 25(*b*) to FIGS. 28(*a*) and 28(*b*) are sections taken along lines B—B' and A—A' in FIG. 19. The structure of the thin film transistor shown in these figures is similar to those shown in FIGS. 21 to 24, excepting that the drain wiring line 108, the gate wiring line 110 and the display element drive electrode 111 are formed below the passivation film 107 and that the current limiting means 104 and the gate 106 are connected via a connecting wiring line 109 by forming contact holes in the passivation film 107. FIG. 25 shows a coplanar structure; FIG. 26 shows an inverted coplanar structure; FIG. 27 shows a staggered structure; and FIG. 28 shows an arrangement with a MOS thin film semiconductor unit having an inverted staggered structure.

Figure 20:
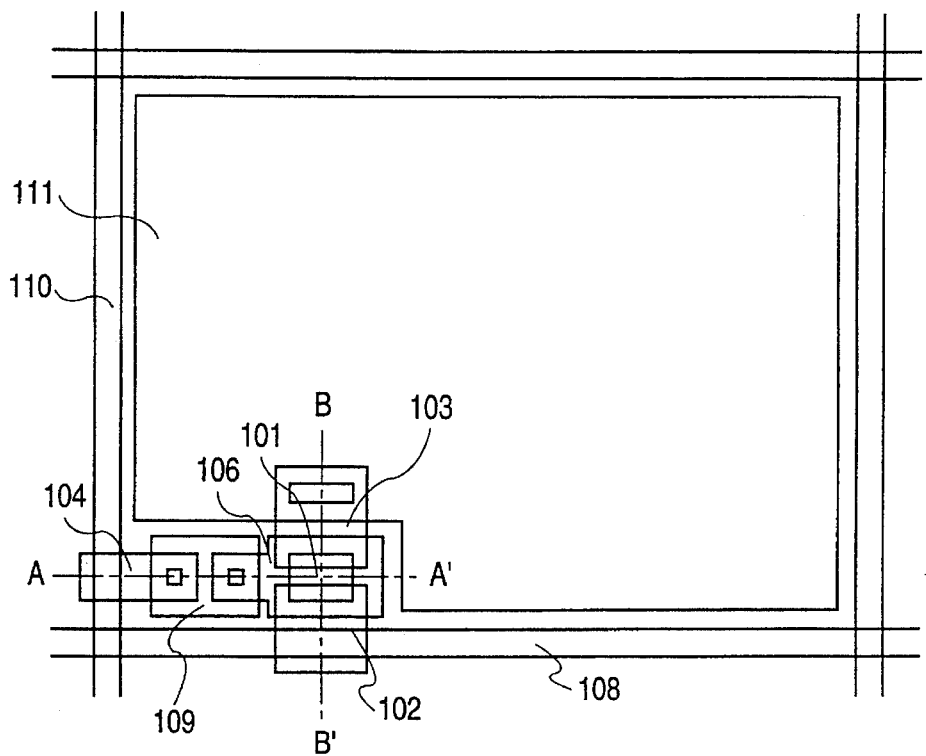
Figure 29A:
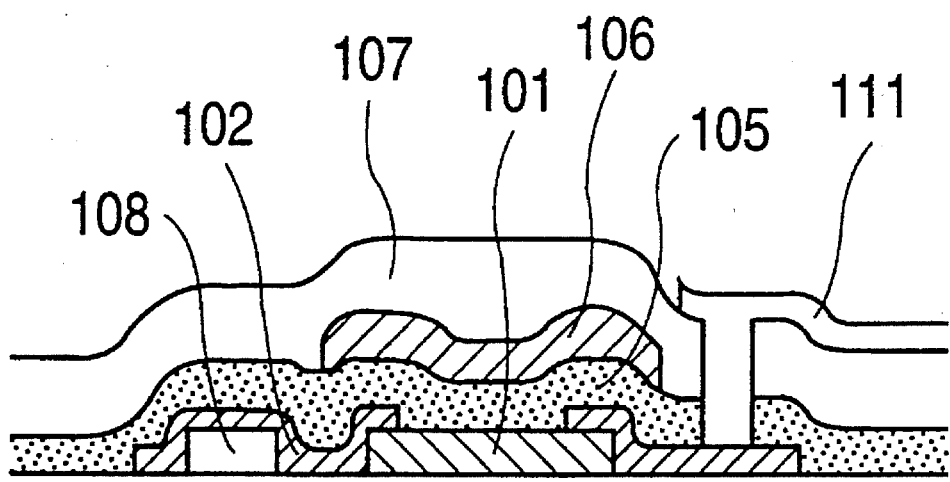
Figure 29B:
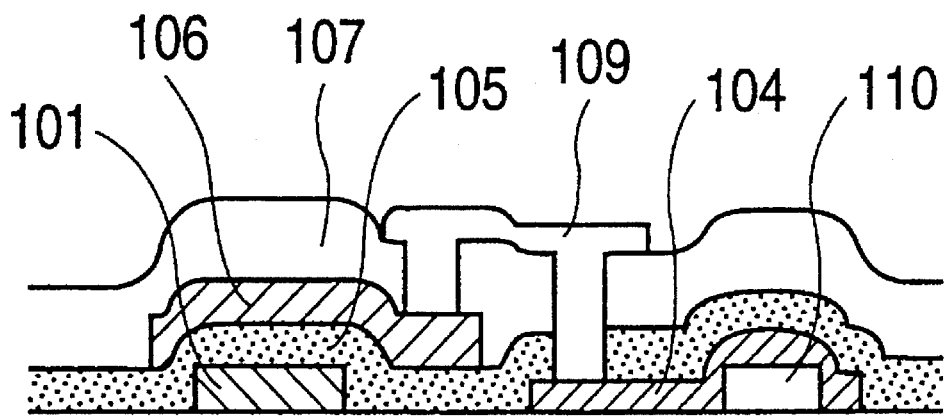
Figure 30A:
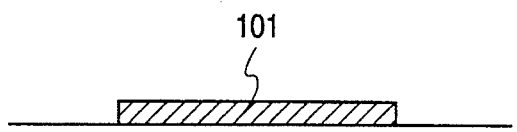
Figure 30B:
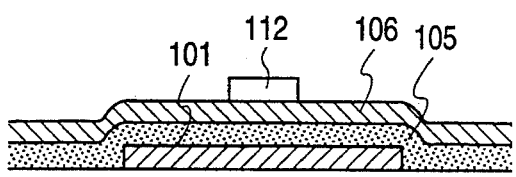
Figure 30C:
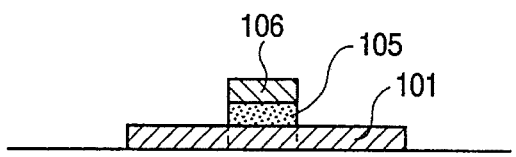
Figure 30D:
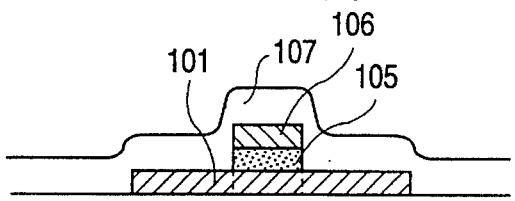
Figure 30E:
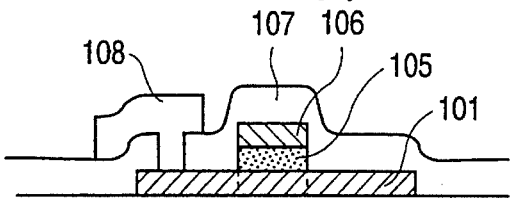
Figure 30F:
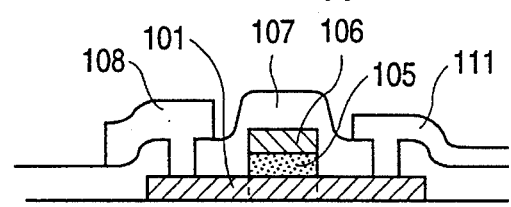
Figure 30G:
Figure 30H:
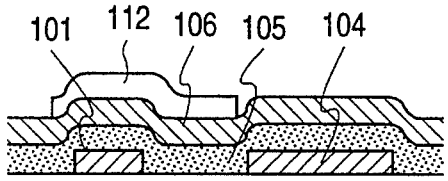
Figure 30I:
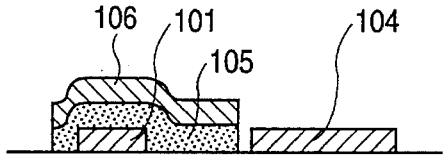
Figure 30J:
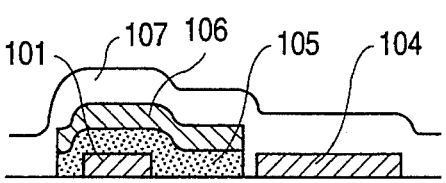
Figure 30K:
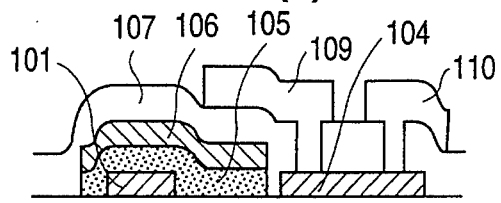
Figure 30L:
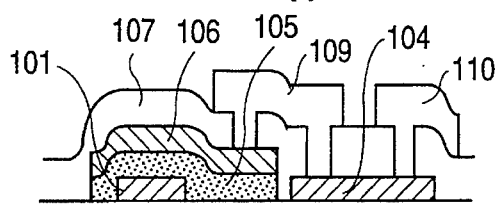

FIGS. 29(*a*) and 29(*b*) are sectional views taken along lines B—B' and A—A' in FIG. 20 and illustrate a matrix drive unit made of a MOS thin film semiconductor device of a coplanar structure, in which the drain wiring line 108 and the gate wiring line 110 are formed below the passivation film 107, as in FIG. 25 and in which the display element drive electrode 111 is formed over the surface of the passivation film 107. Only a coplanar structure is shown, but the sectional structure of FIG. 20 can be adopted, as for FIGS. 24 to 28 to provide an inverted coplanar structure, a staggered structure or an inverted staggered structure, as before.

Next, a process for preparing the drive unit of the MOS thin film semiconductor device having a coplanar structure according to one embodiment of the present invention will now be described.

Figure 17:
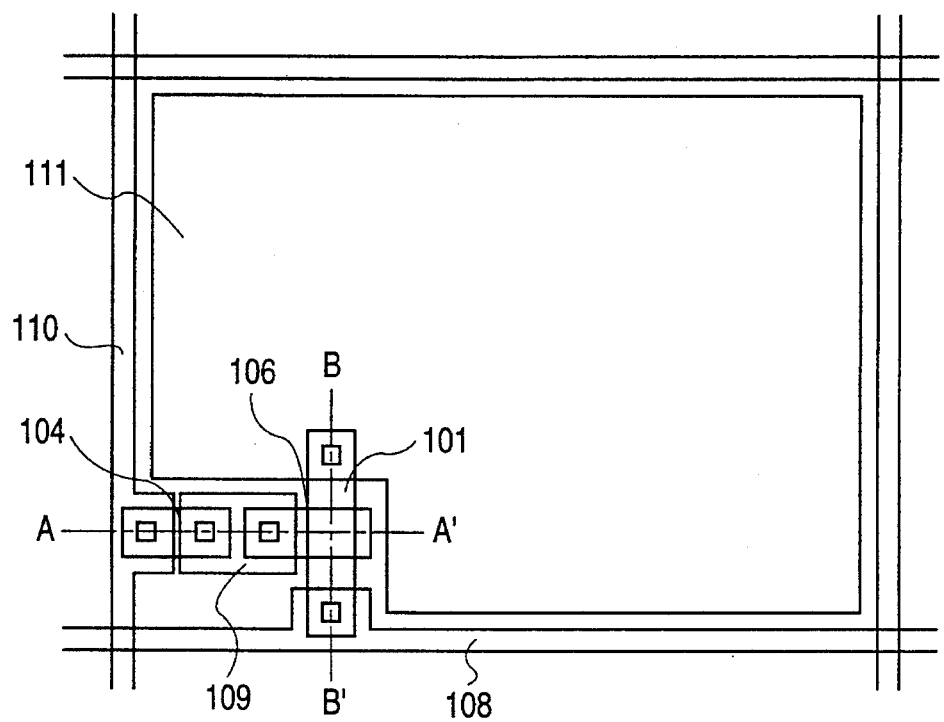

FIGS. 30(*a*) to 30(*f*) and 30(*g*) to 30(*l*) are sections taken along lines B—B' and A—A' of FIG. 17 and showing the preparing steps.

A coating of a semiconductor film 101 is formed over an insulating substrate of glass, quarts or plastics by e.g. a vacuum CVD method, a plasma CVD method, an optical CVD method or a sputtering method, and semiconductor islands 101 and 104 are formed (as shown in FIGS. 30(*a*) and 30(*g*)) by e.g. photo-etching. Alternatively, the substrate may be a conductive substrate, in which the surface is insulated with an insulating film. Next, the semiconductor islands 101 and 104 may be coated with a gate insulating film 105 by e.g. an atmospheric CVD method, a vacuum CVD method, a plasma CVD method, an optical CVD method or a sputtering method. Then, the gate insulating film 105 is coated with a semiconductor film or a metal film for forming a gate 106c, and only the gate part is formed with a photo-resist pattern 112 (as shown in FIGS. 30(*b*) and 30(*h*)). Next, the photoresist film 112 is used as a mask to etch the semiconductor film or metal film 106 for forming the gate, and the gate insulating film 105 is etched. The gate insulating film 105 is then etched and doped with an impurity to form source and drain regions in the semiconductor 101 (as shown in FIGS. 30(*c*) and 30(*i*)), using the gate as the mask, by use of an ion implantation method or a plasma doping method. Next, the aforementioned gate 106 is coated thereover with the passivation film 107 of SiO or Phosphor Silicate glass (PSG). In order to activate the ion-implanted impurity, the device is annealed (as shown in FIGS. 30(*d*) and 30(*j*)) by a hot annealing method in an oven or by an optical annealing method using e.g. a laser beam. Next, the passivation film 107 over the drain region of the semiconductor layer 101 and over the gate region and the current limiting means 104 is formed with contact holes and coated with a metal such as aluminum of a low resistance to form the drain wiring line 108, the connecting wiring line 109 and the gate wiring line 110 by the photo-etching technology (as shown in FIGS. 30(*e*) and 30(*k*)). Finally, contact holes are formed in the passivation film 107 over the source region of the semiconductor 101, the resulting device is covered with a transparent conductive film of ITO (i.e., Indium Tin Oxide), SrO$_2$ or InO$_x$. The result is etched to a suitable pattern to form a picture element drive electrode 111 (as shown in FIGS. 30(*f*) and 30(*l*)).

Thus, a display unit having a current limiting means added thereto is formed.

A further feature of the present invention, relating to the method of forming the display matrix of the display system will now be described. As was mentioned earlier, the present invention proposes that each display unit of the matrix has a current limiting means between the switching element and the scanning line. As has been mentioned earlier, that current limiting means may be a resistance means, in which case an aspect of the present invention proposes that the resistance of that resistance means is adjusted to a value dependent on the resistances of the control means. This aspect will now be described in more detail with reference to FIGS. 31 to 35.

Figure 31A:
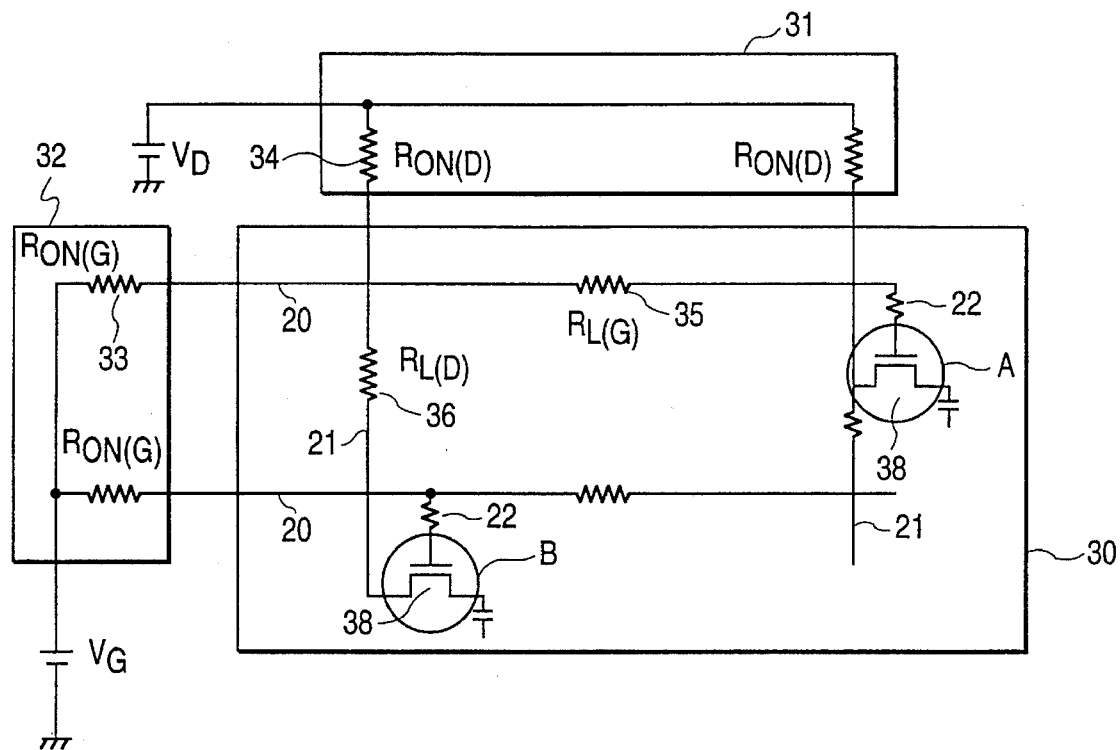
FIGS. 31(a)–31(b) shows a circuit useful in understanding the second aspect of the present invention.
Figure 31B:
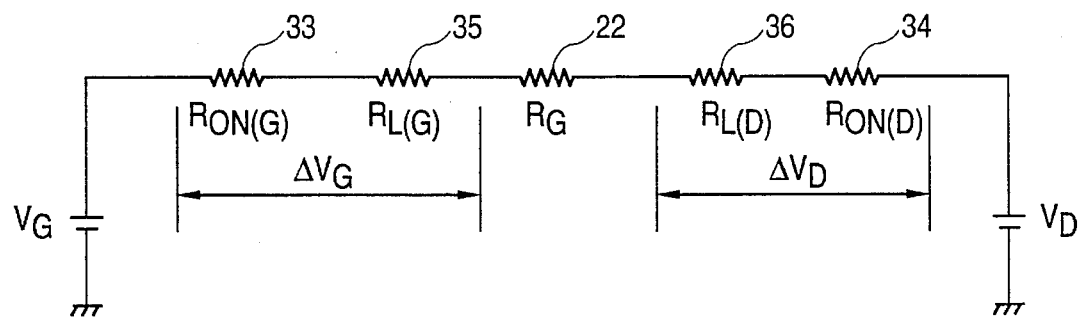

FIG. 31 shows a simplified equivalent circuit of a display system having a display matrix 30 and control means in the form of a signal line address controller 31 and a scanning line address controller 32. The output resistance of the signal line address controller 31 is indicated schematically by output resistor ($R_{ON}(D)$) 34, and the output resistance of the scanning line address controller 32 is indicated by a resistor ($R_{ON}(G)$) 33. The resistance of the scanning line is indicated by resistor ($R_L(G)$) 35 and the resistance of the control line by resistor ($R_L(D)$) 36. FIG. 31 also shows the current limiting means in the form of resistor 22, and the switching element of the display element, indicated by TFT 38.

When the TFT 38 has a fault such that its gate electrode and drain electrode are effectively connected (via a low resistance), the position in which the scanning voltage $V_G$ fluctuates the most is located at the righthand upper end (as indicated at A), whereas the position in which the signal voltage $V_D$ fluctuates the most is located at the lefthand lower end (as indicated at B).

In order to determine the fluctuating voltage $\Delta V_G$ of the scanning voltage and the fluctuating voltage $\Delta V_D$ of the signal voltage, therefore, the circuit of FIG. 31(*a*) can be considered as the resistance network shown in FIG. 31 (*b*).

In FIG. 31(*b*), the fluctuating voltages $\Delta V_G$ and $\Delta V_D$ are determined as in the following equations:

$$\Delta V_G = \frac{R_{ON}(G) + R_L(G)}{R_{ON}(G) + R_L(G) + R_L(D) + R_{ON}(D) + R_G} \times (V_G - V_D) \quad (1)$$

and $$\Delta V_D = \frac{R_{ON}(D) + R_L(D)}{R_{ON}(G) + R_L(G) + R_L(D) + R_{ON}(D) + R_G} \times (V_G - V_D) \quad (2)$$

In these equations (1) and (2), the individual reference letters are indicated in FIG. 31(*b*), and have already been defined, with the exception of resistance $R_G$, which is the resistance of the current limiting means 22.

If the fluctuating voltages $\Delta V_G$ and $\Delta V_D$ are determined from the equations (1) and (2), the conditions of the short resistance $R_G$ can be determined. If $R_{ON}(G)=1$ KΩ, $R_{ON}(D)=2$ KΩ, $R_L(G)=4.5$ KΩ, $R_L(D)=1.5$ KΩ, $V_G=25$ V and $V_D=0$ V, for example, $R_G \geq 100$ KΩ for $\Delta V_G \leq 1$ V, and $R_G \geq 1$ MΩ for $\Delta V_D \leq 70$ mV.

The fluctuation conditions for the latter voltage $V_D$ are determined from the conditions when eight gradations are displayed by using the existing Twisted Nematic (TN) liquid crystal.

From the foregoing results, the lower limit of the resistance of the current limiting means 22 can be the larger one of the values determined from the equations (1) and (2).

The resistance $R_G$ of the current limiting means 22 and the gate capacitance $C_G$ per one step of the TFT, determine the rising and breaking times of the scanning voltage to be applied to the gate electrode. They cause those time to be increased so that the voltage applied to the liquid crystal is insufficient, causing a drop in contrast.

The rising time (the breaking time) $t_r$ at this time is expressed by the following equation:

$$t_r = C_G \times R_G \qquad (3).$$

Hence, the upper limit of resistance $R_G$ is determined if the value of the $t_r$ is determined.

For $t_r=5$ μs and $C_G=0.5$ pF, for example, $R_G \leq 10$ MΩ.

The above value $t_r$ is about 15% of the scanning time $t_L(=35$ us) per line for a scanning line number N=480 and a frame frequency $f_F=60$ Hz and raises no practical problems.

On the other hand, the capacitance $C_G$ has a value determined from the size of the TFT and the stray capacitance at this time.

The specific values thus far described determine the conditions, when used e.g. in the color display for a personal computer or a word processor, but the present invention is not limited to those values.

Thus, the resistance of the current limiting means should be chosen to a value which is determined by the resistance of the control means, particularly the signal and scanning line address controllers 31, 32. In practice, commercially available control circuits vary in their resistances, and therefore it is not possible, for all such control circuits, to predetermine the optimum resistance of the current limiting means, but instead the present invention proposes that, during the manufacture of the display system, the resistance of the current limiting means is adjusted in dependence on the resistances of the control circuit.

One way of achieving such control will now be described, with reference to FIG. 32.

Figure 32:
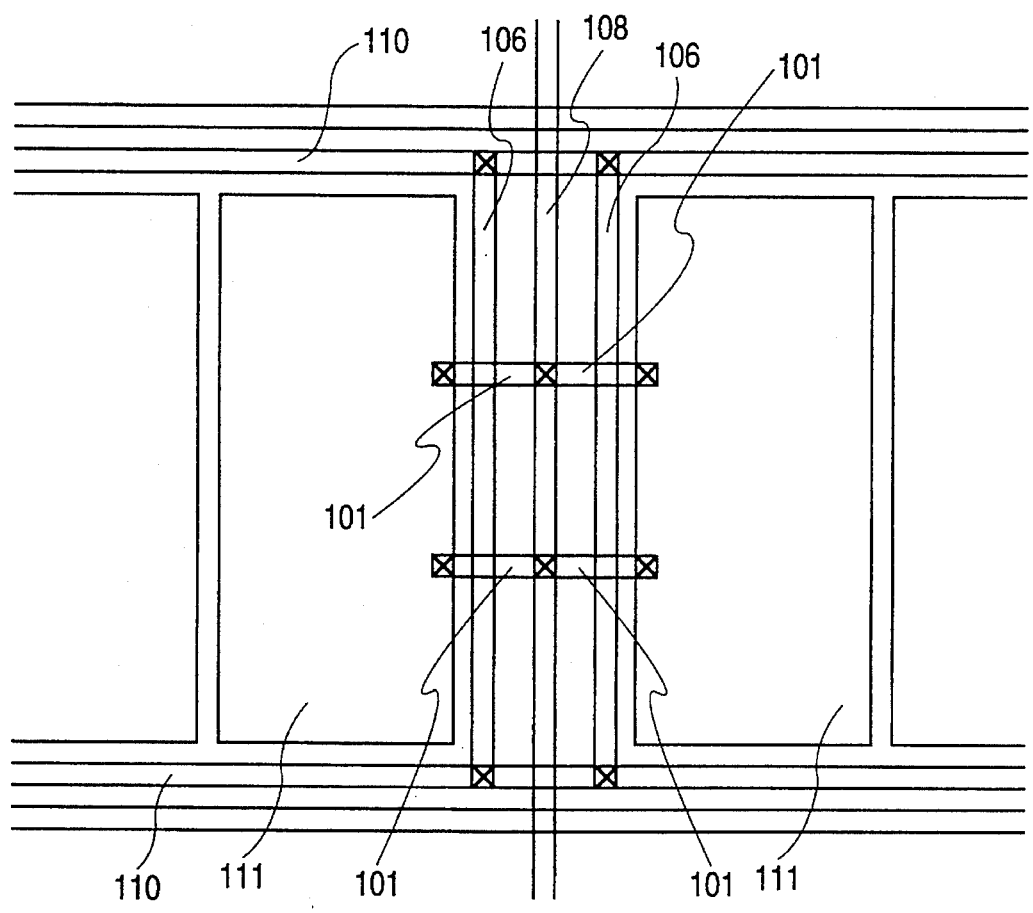
Figure 33:
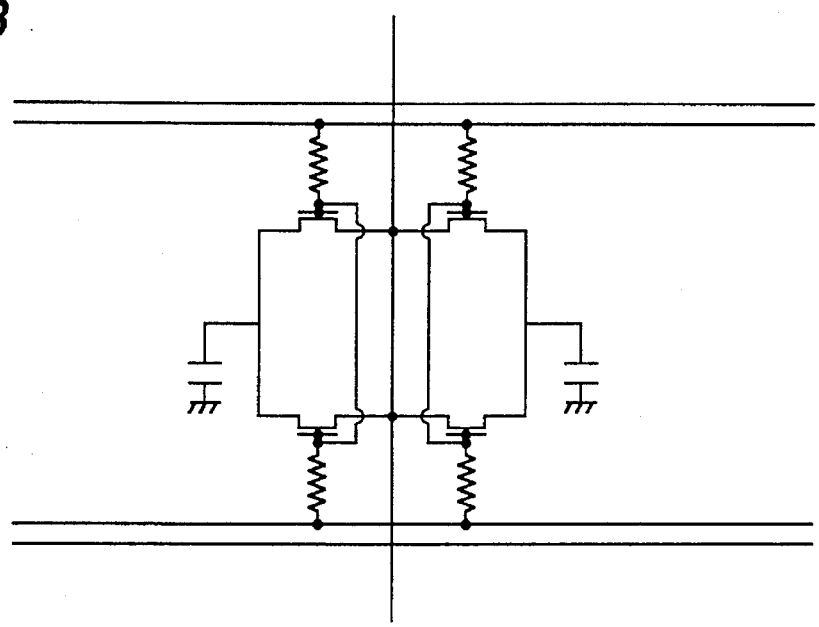

FIG. 32 is a top plan view showing one display unit of the display system having a current limiting means and the four thin film transistors. In the arrangement shown in FIG. 32, the display element is divided into two so as to afford a redundancy, and FIG. 33 is an equivalent circuit of FIG. 32. The resistance can be varied by using the resistance of the gate 106 itself as the current limiting element and by moving the semiconductor layer 101 over the gate 106. In the structure of FIG. 32, the voltage to be applied to the display element drive electrode 111 is always held at a predetermined level even if one gate and the drain are shorted and if one gate wiring line 110 is broken.

Thus, by moving the semiconductor layer 101 closer or further away from the gate wiring line 110, the resistance $R_G$ can be adjusted. The adjustment of the location of the semiconductor layer 101 is a relatively straightforward process, determined by the etching step which produces that layer. Of course, since the arrangement of FIG. 32 is divided into two, to give a redundancy, there are two semiconductor layers 101 whose positions should be adjusted.

Figure 34:
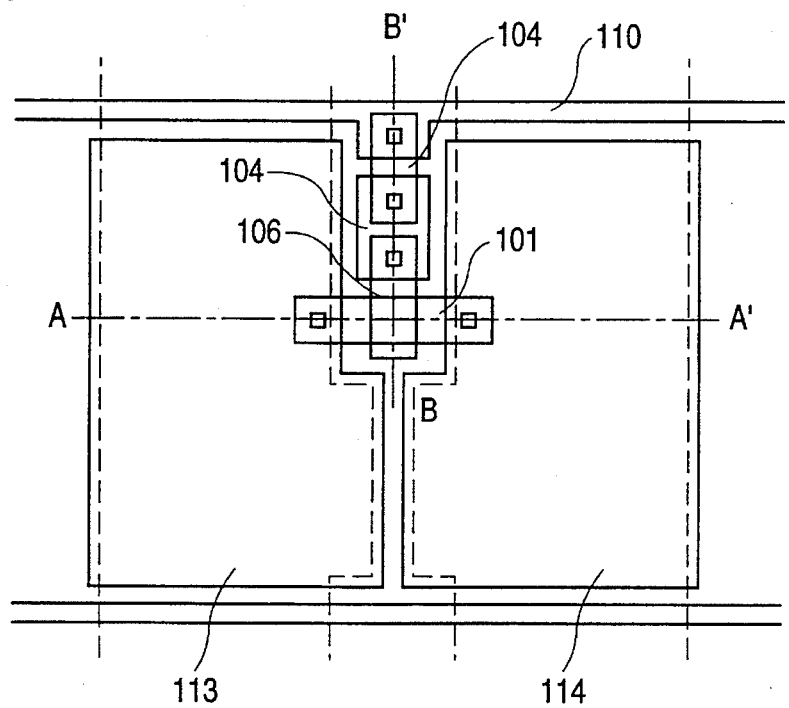
Figure 35:
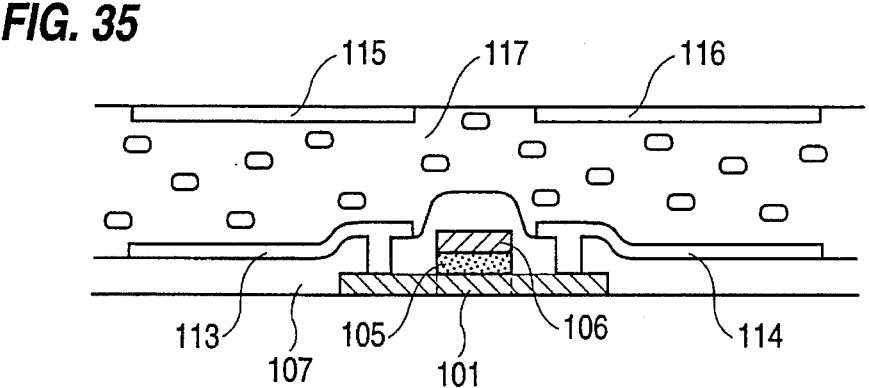
Figure 36:
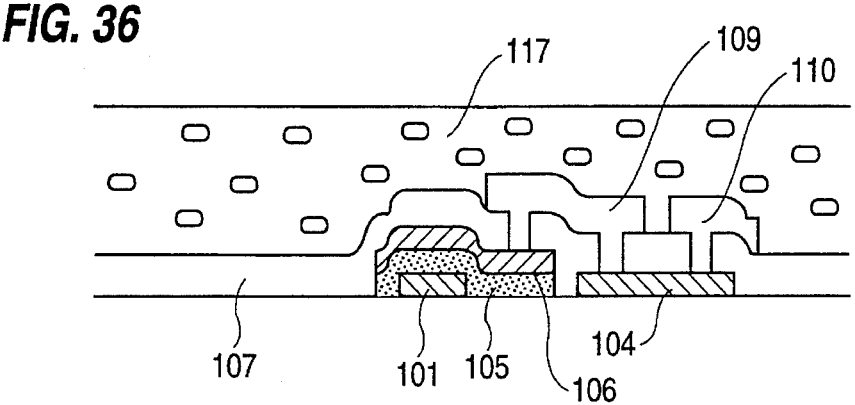

FIG. 34 is a top plan view showing a thin film transistor with a butterfly structure, in which the signal wiring line and the common wiring lines are arranged over the opposed substrate without any intersection of the scanning wiring line and the signal wiring line over the common substrate to eliminate defects due to shorts between the scanning wiring line and the signal writing line. FIGS. 35 and 36 are sections taken along lines A—A' and B—B' of FIG. 34, respectively. The scanning wiring line is arranged over the substrate adjacent the thin film transistor, and the signal wiring line 115 and the common wiring line 116 are arranged over the opposed substrates. The arrangement in FIGS. 34 to 36 has a display system in which the semiconductor 104 doped with the same impurity as that of the source/drain regions is used as a resistor to form the current limiting means and in which the passivation film 107 over the current limiting means and the gate 106 has a contact hole through which a connecting wiring line 109 is formed of gate wiring material.

When the current limiting means is based on a resistance, e.g. an Si semiconductor doped with an impurity, a resistor of n-type silicon having a width W, a length L at W/L=1 and a thickness of 100 nm and doped with an impurity such as phosphor (P), arsenic (As) or antimony (Sb) provides a resistance of 1MΩ at an impurity concentration of $4\times10^{-14}$ cm$^{-3}$. Alternatively, a resistor of p-type silicon doped with an impurity of boron (B) acquires a resistance of 1MΩ at an impurity concentration of $1\times10^{-15}$ cm$^{-3}$. For W/L=0.1 to 1.0, the aforementioned resistor acquires a resistance of 1 to 10MΩ.

In addition, the resistance is reduced if the impurity concentration is increased, and increased if the concentration is reduced. Moreover, the resistance varies in proportion to the film thickness if this film thickness is varied. For example, a resistance of 10MΩ is achieved if the thickness of the film of 1MΩ is dropped to 10 nm.

Figure 37:
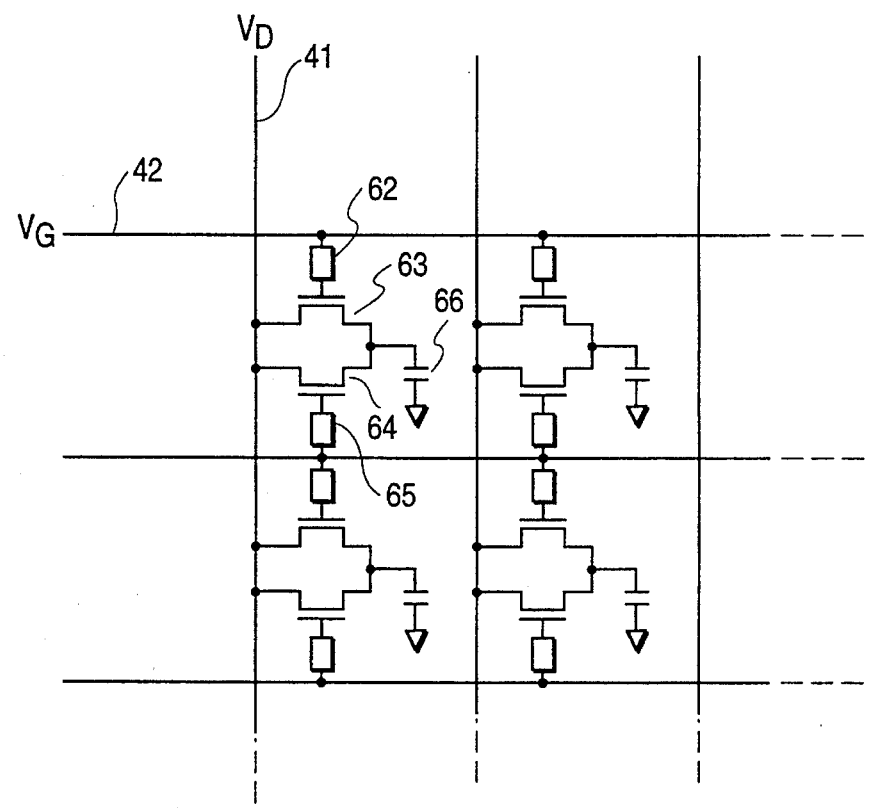

FIG. 37 shows a further arrangement of the display unit which may be used in the present invention. In FIG. 37 each display element has current limiting elements 62 and 65, TFTs 63 and 64 and a liquid crystal picture element 66.

With the arrangement, even if either the TFTs 63 and 64 connected to the signal line 41 is shortened, so that it is non-conductive at all times, a normal image may be displayed by the liquid crystal display element 66.

Moreover, there is a low probability that the TFTs 63 and 64 are both non-conductive (i.e. both are defective simultaneously). Therefore, the probability of no signal voltage being applied to the liquid crystal display element 66 is practically zero.

Figure 38:
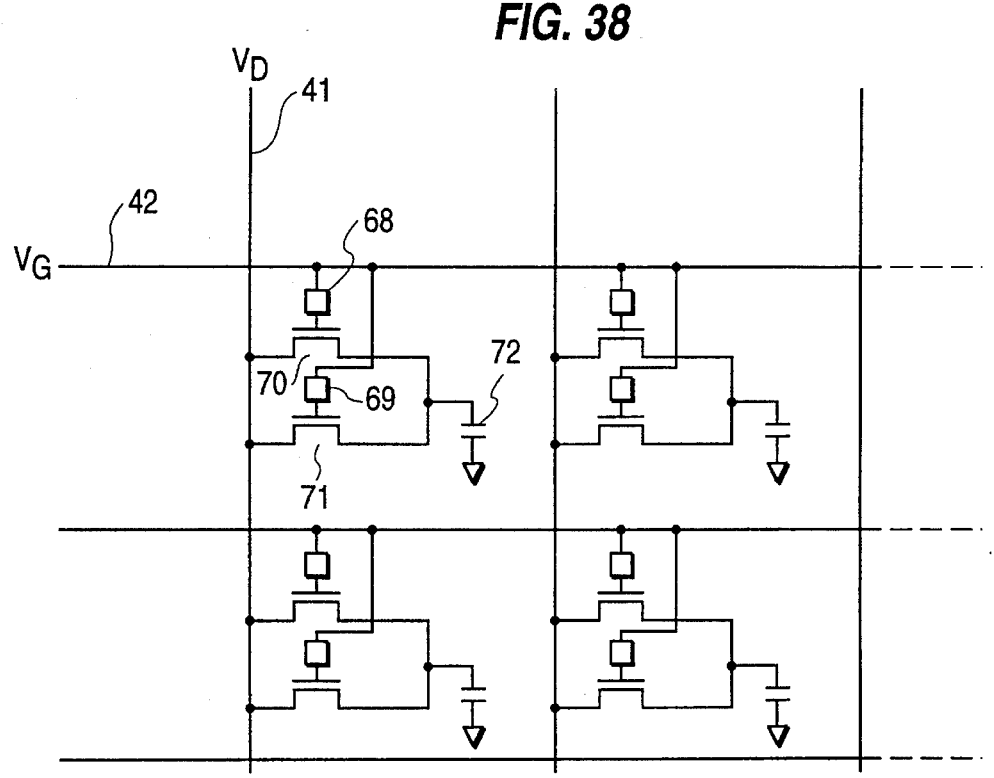

FIG. 38 shows another arrangement of the display unit. Each display element is constructed of current limiting means 68 and 69, TFTs 70 and 71 and a liquid crystal display element 72.

Even if either of the TFTs 70 and 71 connected to the signal line 41 fail due to a short circuit, so that one or other is non-conductive at all times, a normal image is displayed by the liquid crystal display element 72.

Again, the probability that both TFTs 70 and 71 are nonconductive (both defective) is low. Therefore, again the probability of no signal voltage being applied to the liquid crystal picture element 72 is practically zero.

Figure 39:
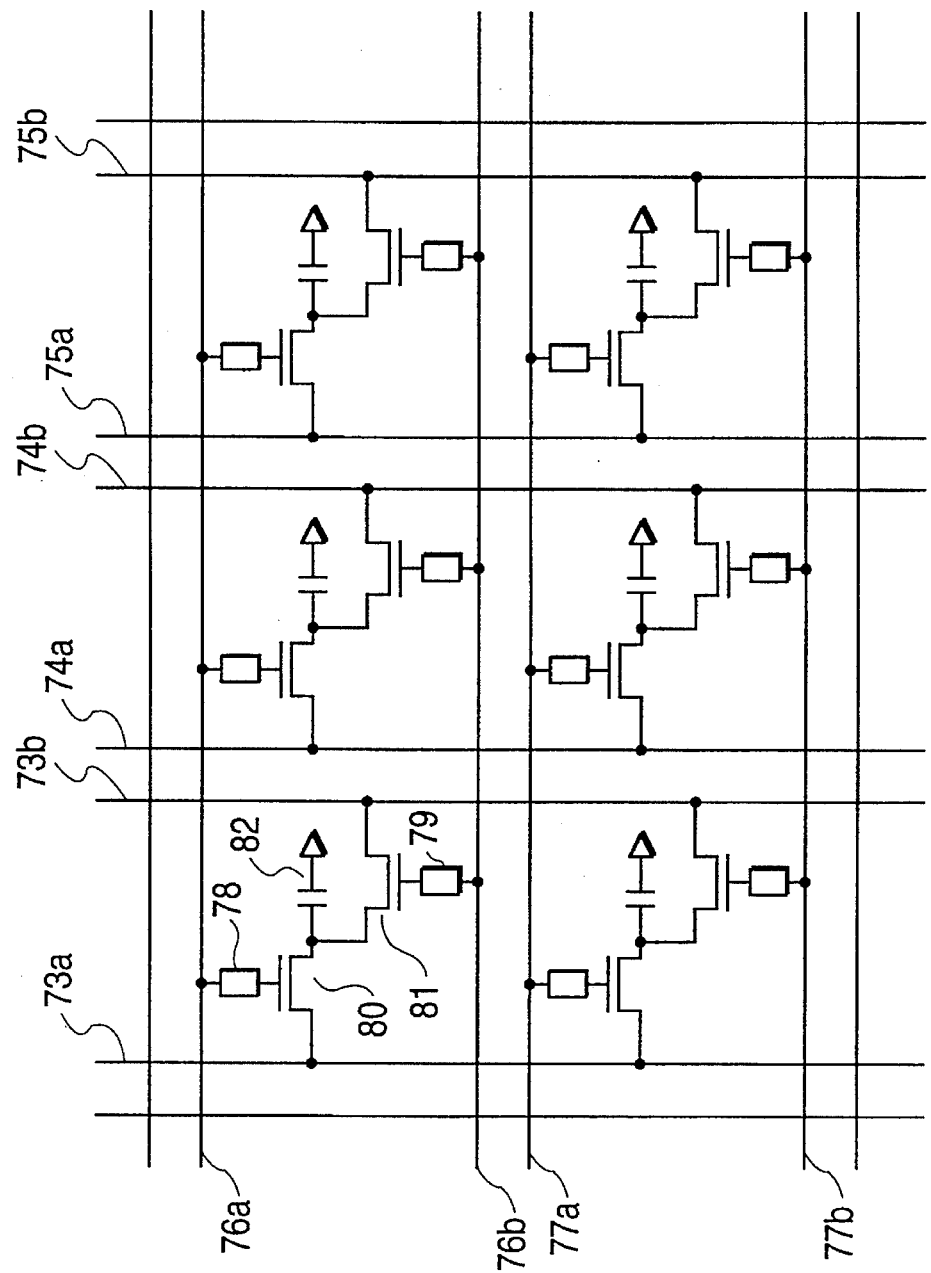

FIG. 39 shows still another display unit arrangement. Signal lines 73a and 73b, 74a and 74b, and 75a and 75b each form pairs individually fed, with the lines of each pair receiving common signal voltages.

On the other hand, scanning lines 76a and 76b and 77a and 77b form pairs individually fed, and the lines of the pairs receive common scanning voltages.

Moreover, one picture element is constructed of current limiting means 78 and 79, TFTs 80 and 81, and a liquid crystal display element 82.

In FIG. 39, the liquid crystal display element 82 is normally fed with a signal voltage no matter which of the scanning lines and the signal lines might be cut. Since, moreover, there is a low probability that two lines are cut simultaneously, the probability of no signal voltage being applied to the liquid crystal picture element 82 is substantially zero.

As can be appreciated from the above, it is desirable that breaks in the wiring lines do not cause malfunction of the display unit. The arrangement of FIG. 39 achieved this, but only by providing two switching units 80, 81, and two current limiting means 78, 79, for each display element 82. This increases the number of components, and is generally not preferred. Instead, it is proposed that the signal and scanning lines are formed by pairs of conductors, at least over a significant part of their length. Arrangements in which this is achieved will now be described with reference to FIGS. 40 and 41, which illustrate the matrix of the signal lines and scanning lines. Of course, such a matrix needs to be connected to a suitable control circuit in order to operate.

Figure 40:
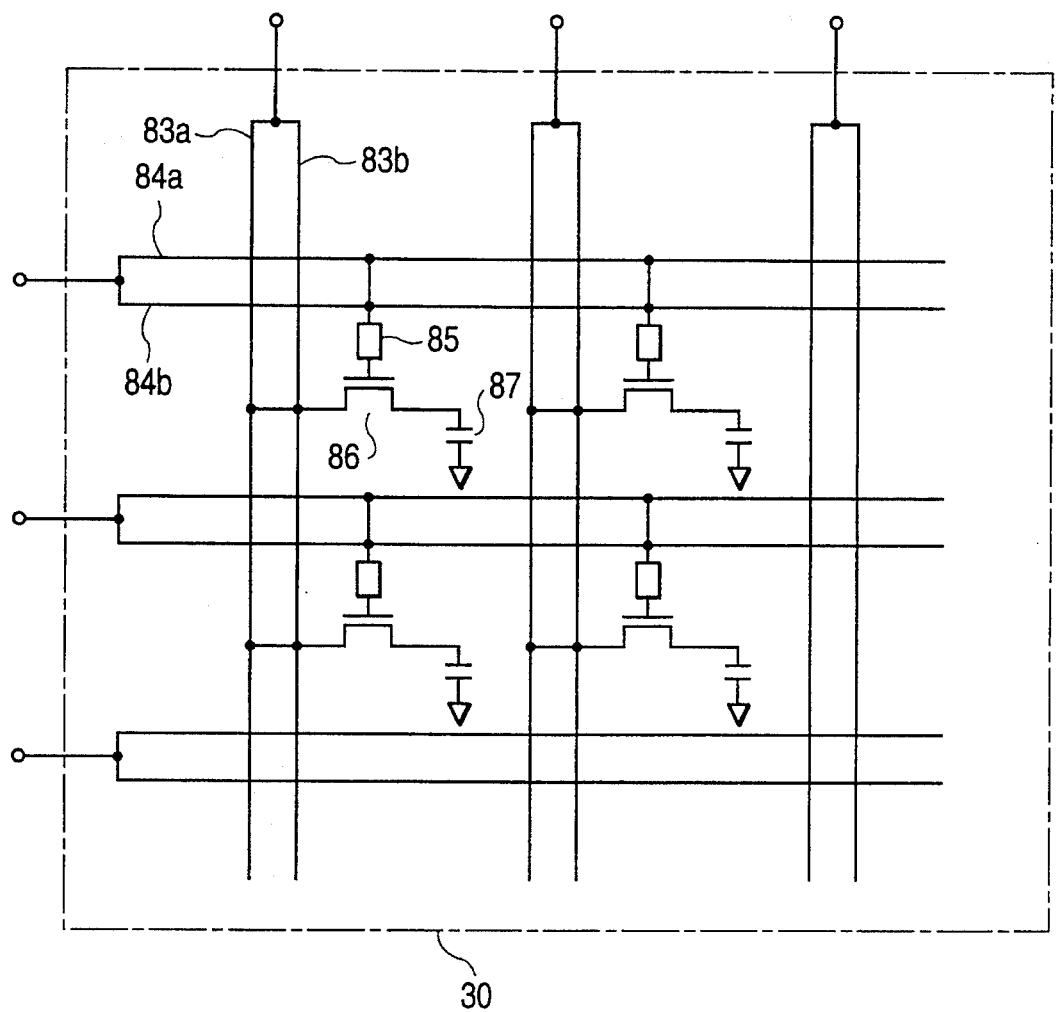
Figure 41:
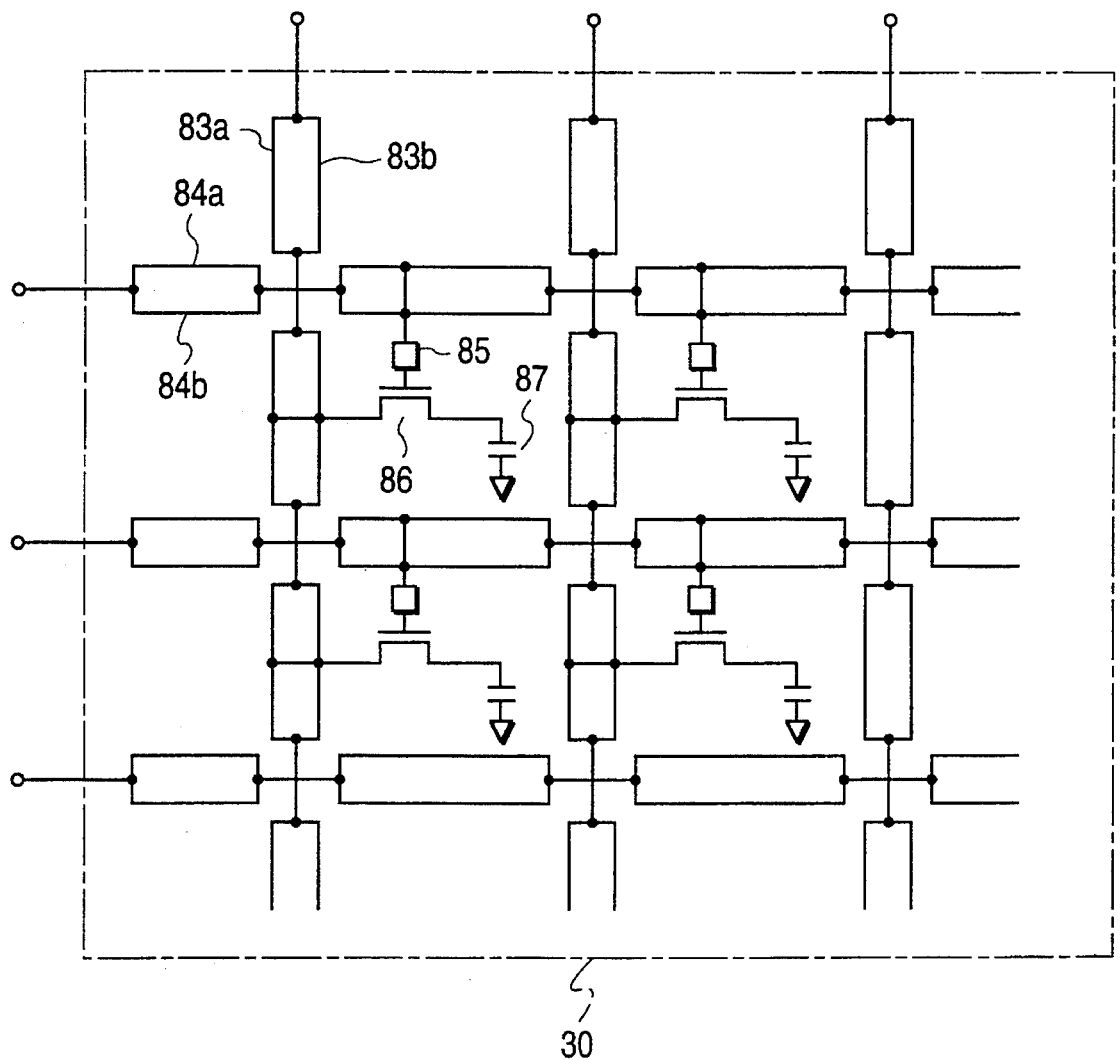

The matrix of FIG. 40 has control and scanning lines which, over substantially their entire length across the matrix, are formed by generally parallely extending pairs of conductors. Thus, there may be a pair of scanning conductors 84a, 84b, both of which are connected to the current limiting means 85, and a corresponding pair of signal conductors 83a, 83b which are both connected to the drive electrode of the switching element 86. In this arrangement, the display element 87 may be a liquid crystal, or may be another suitable display element.

However, the disadvantage of the arrangement of FIG. 40 is that each intersection of a similar line and a scanning line results in four crossing points. This increases the risk of shorts between the lines at those crossing points, and to overcome this the arrangement in FIG. 41 can be used, in which the signal lines and the scanning line are formed by pairs of conductors 83a, 83b and 84a, 84b respectively, over part of their length, but those pairs of conductors are joined at the intersection points. In this arrangement, the lines should be formed by pairs of conductors at least at and adjacent their connection to the display unit, but preferably over substantially their entire length between the intersection points.

Thus, according to the present invention, it is possible to design a display system in which the risk of defects is reduced or eliminated. In particular, defects due to short circuits in the display elements may be overcome by suitable application of voltages to the display units, and in particular by applying voltages to the signal lines other than at times when voltages are applied to the scanning lines, but also, separately or in addition, providing redundancy of components within each unit, and within the lines themselves, by forming those lines of branch conductors. Furthermore, the units may themselves be adjusted in dependence on the control means to which the display system is connected to reduce the risk of mis-matching. The present invention has been particularly designed for display systems involving liquid crystals. However, the present invention is not limited to this and may be used in conjunction with other types of display elements, including both display elements which are intended to generate a displayed image, and display elements which are intended to detect images.

What is claimed is:

1. A display system comprising:
    at least one scanning line;
    at least one signal line;
    at least one display unit having a first switching element, said first switching element having a first drive electrode and a second drive electrode and a control electrode, said first drive electrode being connected to said at least one signal line, said at least one display unit further including a display element connected to said second drive electrode and a first current limiting means provided adjacent to said control electrode and said at least one scanning line; and
    control means for applying a signal voltage to said at least one signal line and a scanning voltage to said at least one scanning line, to scan said at least one display element and applying a predetermined voltage to said at least one signal line during a flyback time of said at least one scanning line, wherein the predetermined voltage ($V_{on}$) has a relationship with an effective value ($V_{LC}$) of a voltage supplied to a display element for achievement of a required brightness of the display element as follows:

$$V_{ON}\sqrt{\frac{T_o}{T_F}} \geqq V_{LC}$$

wherein $T_F$ denotes a scanning time of one of consecutive frames and $T_0$ a flyback time of one frame.

2. A display system according to claim 1, wherein said display element includes a liquid crystal.

3. A display system according to claim 2, wherein said display element further including a pair of polarisers with said liquid crystal being located adjacent to said pair of polarisers.

4. A display system according to claim 3, wherein said pair of polarisers and said liquid crystal are arranged such that, unless said display unit is faulty, said pair of polarisers and said liquid crystal pass light therethrough in the absence of a voltage to said liquid crystal.

5. A display system according to claim 1, wherein said display element has a brightness state dependent on said voltage applied thereto, and said predetermined voltage is such as to maintain substantially constant said brightness state of said display element when a short occurs between said control electrode of said first switching element and said at least one signal line.

6. A display system according to claim 1, wherein said display element has a brightness state dependent on said voltage applied thereto, and said predetermined voltage is such as to maintain said brightness state of said display element between 0% and 10% of a maximum possible brightness of said display element when a short occurs between said control electrode of said first switching element and said at least one signal line.

7. A display system according to claim 1, wherein said first current limiting means is a resistance.

8. A display system according to claim 7, wherein said resistance is between 1MΩ and 10MΩ.

9. A display system according to claim 1, including a plurality of said scanning lines, a plurality of said signal lines and a plurality of said display units; each one of said plurality of display units being connected to respective ones of said scanning lines and said signal lines.

10. A display system according to claim 1, wherein said at least one scanning line and said at least one signal line are at least at and adjacent to the respective connections to said first current limiting means and said first drive electrode, said at least one scanning line and said at least one signal line in the form of a pair of conductors with said first current limiting means and said first drive electrode being respectively connected to said conductors of the corresponding line.

11. A display system according to claim 1, wherein said first current limiting means is a doped semiconductor layer.

12. A display system according to claim 1, wherein said first current limiting means is a polysilicon layer.

13. A display system according to claim 1, wherein said at least one display unit has a second switching element connected adjacent to said display element and said at least one signal line, and including a second current limiting means adjacent to said second switching element and said at least one scanning line.

14. A display system comprising:

a plurality of scanning lines;

a plurality of signal lines arranged in a matrix with said scanning lines intersecting said signal lines;

a plurality of display units, each one of said display units being located at the intersection of a respective one of said scanning lines and a respective one of said signal lines, each one of said display units including a first switching element having a first drive electrode and a second drive electrode and a control electrode, said first drive electrode being connected to the respective signal line, each one of said display units further including a display element connected to said second drive electrode of said switching element and a first current limiting means connected adjacent to said control electrode of said switching element and said at least tone scanning line; and control means for applying signal voltages sequentially to said plurality of signal lines and scanning voltages sequentially to said plurality of scanning lines, to scan sequentially said display elements, and applying a predetermined voltage to a respective one of said signal lines during a flyback time of the corresponding scanning line, wherein the predetermined voltage ($V_{on}$) has a relationship with an effective value ($V_{LC}$) of a voltage supplied to a display element for achievement of a required brightness of the display element as follows:

$$V_{ON}\sqrt{\frac{T_O}{T_F}} \geq V_{LC}$$

wherein $T_F$ denotes a scanning time of one of consecutive frames and $T_0$ a flyback time of the one frame.

15. A display system according to claim 14, wherein each one of said display units including a second switching element connected adjacent to said display element and said respective signal line, and a second current limiting means adjacent to said second switching element and said respective scanning line.

16. A display system according to claim 14, wherein each one of said display units including a second switching element connected adjacent to said display element and said respective signal line, and a second current limiting means adjacent to said second switching element and a respective one of said scanning lines.

17. A display element according to claim 14, wherein each said display element including a second switching element adjacent to said display element and a respective one of said signal lines, and a second current limiting means adjacent to said second switching element and a respective one of said scanning lines.

18. A display system according to claim 14, wherein said display element includes a liquid crystal.

19. A display system according to claim 14, wherein said predetermined voltage applied to said second means is determined so as to maintain substantially constant a brightness state of said display element of any one of said plurality of display units in which a short occurs between said signal line and the connection of said first current limiting means to said first switching element.

20. A display system according to claim 19, wherein said display element includes a liquid crystal.

21. A display system according to claim 14, wherein said predetermined voltage applied by said second means is determined so as to maintain a brightness state of said display element of any one of said plurality of display units in which a short occurs between said signal line and the connection of said first current limiting means to said first switching element between 0% and 10% of a maximum possible brightness of that display element.

22. A display system according to claim 21, wherein said display element includes a liquid crystal.

23. A display system according to claim 14, wherein each one of said display units having a connection to the respective signal line and a connection to the respective scanning line, and said at least one scanning line and said at least one signal line are at least at and adjacent to the connections to said display units, said at least one scanning line and said at least one signal line in the form of a pair of adjacent conductors, wherein said conductors being connected to the respective display unit.

24. A display system according to claim 23, wherein said at least one signal line and said at least one scanning line is in the form of a single conductor at their intersections.

25. A display system according to claim 23, wherein each said pair of conductors are connected together at their respective connections to said display units.

26. A display system comprising:

at least one scanning line;

at least one signal line;

at least one display unit, said at least one display unit having a switching element, said switching element having a first drive electrode and a second drive electrode and a control electrode, said first drive electrode being connected to said at least one signal line, said at least one display unit further including a display element connected to said second drive electrode and a current limiting means provided adjacent to said control electrode and said at least one scanning line; and said method comprising the steps of:

a) applying a signal voltage to said at least one signal line and a scanning voltage to said at least one scanning line, to scan said at least one display element; and b) applying a predetermined voltage to said at least one signal line during a flyback time of said at least one scanning line, wherein the predetermined voltage ($V_{on}$) has a relationship with an effective value ($V_{LC}$) of a voltage supplied to a display element for achievement of a required brightness of the display element as follows:

$$V_{ON}\sqrt{\frac{T_O}{T_F}} \geq V_{LC}$$

wherein $T_F$ denotes a scanning time of one of consecutive frames and $T_0$ a flyback time of the one frame.

27. A method according to claim 26, wherein said steps a) and b) are repeated sequentially.

28. A method according to claim 27, wherein for each repetition of steps a) and b), at least said signal voltage and said predetermined voltage have the opposite polarity to said signal voltage and said predetermined voltage in the preceding repetition of steps a) and b).

29. A method according to claim 26, wherein said display element has a brightness state depending on said voltage applied thereto.

30. A method according to claim 29, wherein the relationship between said predetermined voltage $V_{ON}$, the voltage $V_{LC(10)}$ which, when applied to said display element gives a brightness of 10% of said maximum brightness thereof, the duration $T_0$ of said predetermined voltage, and the duration $T_1$ of the image voltage is $$V_{ON} \frac{T_0}{\sqrt{T_0 + T_1}} \geqq V_{LC} \tag{10}$$

31. A display system comprising:

a plurality of scanning lines;

a plurality of signal lines arranged in a matrix with said scanning lines intersecting said signal lines;

a plurality of display units, each one of said display units being located at the intersection of a respective one of said scanning lines and a respective one of said signal lines, each one of said display units having a switching element having a first drive electrode and a second drive electrode and a control electrode, said first drive electrode being connected to the respective signal line, each one of said display units further including a display element connected to said second drive electrode of said switching element and a current limiting means connected adjacent to said control electrode of said switching element and a corresponding one of said scanning lines;

said method comprising the steps of:

a) applying a signal voltage sequentially to said plurality of signal lines;

b) applying scanning voltages sequentially to said plurality of scanning lines, said signal voltages and said scanning voltages being applied such that each one of said display units has a respective one of said signal voltages and a respective one of said scanning voltages applied simultaneously thereto; and c) applying a predetermined voltage to a respective one of said signal lines during a flyback time of the corresponding scanning line for each one of said display unit, wherein the predetermined voltage ($V_{on}$) has a relationship with an effective value ($V_{LC}$) of a voltage supplied to a display element for achievement of a required brightness of the display element as follows:

$$V_{ON}\sqrt{\frac{T_O}{T_F}} \geqq V_{LC}$$

wherein $T_F$ denotes a scanning time of one of consecutive frames and $T_0$ a flyback time of the one frame.

32. A method for use in operating a display system according to claim 31, wherein said method comprises:

applying voltages respectively to at least one of said plurality of signal lines so as to maintain substantially constant a brightness state of said display element of any one of said plurality of display units in which a short occurs between said signal line and the connection of said current limiting means to said switching means.

33. A method for use in operating a display system according to claim 31, wherein said method comprises:

applying voltages respectively to at least one of said plurality of signal lines so as to maintain a brightness state of said display element of any one of said plurality of display units in which a short occurs between said signal line and the connection of said current limiting means to said switching means between 0% and 10% of the maximum possible brightness of that display element.

* * * * *